US012556848B2

(12) United States Patent
Kirsch et al.

(10) Patent No.: US 12,556,848 B2
(45) Date of Patent: Feb. 17, 2026

(54) SPEAKER ARRAY WITH ADJUSTABLE HANGING SYSTEM

(71) Applicant: QSC, LLC, Costa Mesa, CA (US)

(72) Inventors: James Kirsch, Irvine, CA (US); Joshua Lambeth, Costa Mesa, CA (US); Richard Young, Costa Mesa, CA (US)

(73) Assignee: QSC, LLC, Costa Mesa, CA (US)

( * ) Notice: Subject to any disclaimer, the term of this patent is extended or adjusted under 35 U.S.C. 154(b) by 294 days.

(21) Appl. No.: 18/505,050

(22) Filed: Nov. 8, 2023

(65) Prior Publication Data

US 2024/0171890 A1 May 23, 2024

Related U.S. Application Data

(63) Continuation of application No. 17/713,207, filed on Apr. 4, 2022, now Pat. No. 11,832,040.

(Continued)

(51) Int. Cl.

*H04R 1/02* (2006.01)
*H04R 1/32* (2006.01)
*H04R 1/40* (2006.01)

(52) U.S. Cl.

CPC ............. *H04R 1/026* (2013.01); *H04R 1/323* (2013.01); *H04R 1/403* (2013.01)

(58) Field of Classification Search

CPC ......... H04R 1/026; H04R 1/323; H04R 1/403

See application file for complete search history.

(56) References Cited

U.S. PATENT DOCUMENTS 5,749,137 A 5/1998 Martin
7,328,769 B1 2/2008 Adamson (Continued)

FOREIGN PATENT DOCUMENTS

CN 211909056 U 11/2020
WO 9908479 A1 2/1999

(Continued)

OTHER PUBLICATIONS

"Examiner Requisition", PCT Patent Application PCT/US2022/023368, CA App No. 3,213,876 mailed Dec. 3, 2024, 4 pages.

(Continued)

*Primary Examiner* — Andrew Sniezek

(74) *Attorney, Agent, or Firm* — Perkins Coie LLP

(57) ABSTRACT

Speaker mounting systems configured to assembly a line array coupled to a support are provided. The mounting systems generally include an engagement system having a hanger assembly with a boom arm including upper connection points. In a first speaker, the upper connection points can be operably coupled to the support. The line array can include a second speaker having an engagement system including a hanger assembly having a boom arm with upper connection points operably coupled to the lower connection points of the first speaker. The boom arm of the second speaker can be pivotably coupled to the second speaker such that the boom arm is adjustable between at least a first position, corresponding to a first splay angle between front faces of the first and second speakers, and a second position, corresponding to a second splay angle between the front faces of the first and second speakers.

19 Claims, 23 Drawing Sheets

Related U.S. Application Data

(60) Provisional application No. 63/171,030, filed on Apr. 5, 2021.

(56) References Cited

U.S. PATENT DOCUMENTS

| | | | | |
|---|---|---|---|---|
| 7,805,286 | B2 | 9/2010 | Jorgensen et al. | |
| 7,813,516 | B1 | 10/2010 | Graber | |
| 7,929,720 | B2 | 4/2011 | Ishibashi et al. | |
| 8,189,822 | B2 | 5/2012 | Jakowski | |
| 8,320,824 | B2 | 11/2012 | Banks et al. | |
| 8,345,883 | B2 | 1/2013 | Takumai et al. | |
| 8,761,419 | B2 | 6/2014 | Devantier et al. | |
| 8,817,995 | B2 | 8/2014 | Huijser et al. | |
| 8,903,526 | B2 | 12/2014 | Beckhardt et al. | |
| 9,042,556 | B2 | 5/2015 | Kallai et al. | |
| 9,173,020 | B2 | 10/2015 | Cheng et al. | |
| 9,661,418 | B2 | 5/2017 | Butler et al. | |
| 9,911,406 | B2 | 3/2018 | Butler et al. | |
| 10,187,723 | B2 | 1/2019 | Sannie et al. | |
| 11,832,040 | B2 | 11/2023 | Hawkins et al. | |
| 2002/0071580 | A1 | 6/2002 | Engebretson et al. | |
| 2005/0232455 | A1 | 10/2005 | Monitto et al. | |
| 2013/0039527 | A1* | 2/2013 | Jensen | H04R 1/24 381/387 |
| 2014/0205126 | A1 | 7/2014 | Faranda et al. | |
| 2017/0171650 | A1 | 6/2017 | Christner et al. | |
| 2018/0007456 | A1 | 1/2018 | Spillmann et al. | |

FOREIGN PATENT DOCUMENTS

| | | | |
|---|---|---|---|
| WO | 2007028094 | A1 | 3/2007 |
| WO | 2008115284 | A2 | 9/2008 |
| WO | 2012023864 | A1 | 2/2012 |

OTHER PUBLICATIONS

Enzo DeSena et al., “Analysis and Design of Multichannel Systems for Perceptual Sound Field Reconstruction.” IEEE Transactions on Audio, Speech, and Language Processing, vol. 21, No. 8, Aug. 2013, pp. 1653-1665.

Hill, Adam J. et al., “Subwoofer positioning, orientation and calibration for large-scale sound reinforcement”. Audio Engineering Society, Convention Paper 7971, Presented at the 128th Convention, May 22-25, 2010, London UK, 19 pages.

Hoy, William R. et al., “Loudspeaker Complex Directional Response Characterization”. Eastern Acoustic Works, Inc., Whitinsville, MA. 23 pages. published Nov. 2001.

International Searching Authority, International Search Report and Written Opinion, PCT Patent Application PCT/US2022/023368, mailed Jul. 15, 2022, 18 pages.

Mario Di Cola et al., “Design and Optimization of High Directivity Waveguide for Vertical Array”. Audio Engineering Society, Convention Paper 7955, Presented at the 127th Convention, Oct. 9-12, 2009, 14 pages.

* cited by examiner

SPEAKER ARRAY WITH ADJUSTABLE HANGING SYSTEM

CROSS-REFERENCE TO RELATED APPLICATION

This U.S. non-provisional patent application is a continuation of U.S. non-provisional patent application Ser. No. 17/713,207, titled Speaker Array with Adjustable Hanging System, and filed Apr. 4, 2022, which claims the benefit of and priority to U.S. provisional patent application No. 63/171,030, titled Speaker Array with Smart Hanging System, and filed Apr. 5, 2021, all of which are incorporated herein in their entirety by reference.

TECHNICAL FIELD

Embodiments of the present invention are directed to audio speakers, and more particularly to line array speaker systems.

BACKGROUND

Line array speaker assemblies typically include multiple speakers or other direct-radiating electro-acoustical drivers removably interconnected along a selected line. The speakers may be arranged in a line that is straight, progressive, or otherwise arcuate. During installation, each speaker is connected to the speaker above and/or below it, and each speaker must be oriented at a selected angle, so the speakers within the line array are properly aimed. The speakers can be heavy and cumbersome, such that the process to install and disassemble a linear array assembly is labor intensive and typically requires more than one person to handle and adjust the speakers.

The speakers within the line array are typically coupled to one or more audio processors or other control systems to produce controlled vertical and horizontal angular coverage with the desired phase coherence, distortion reduction, and other desired performance characteristics for the venue in which the line array is installed. The number of speakers in the line array, the angular orientation of line array, the angular orientation of each speaker within the line array, and each speaker's position within the line array can be critical for proper audio processing to achieve the desired acoustic performance for the particular venue in which the line array is installed. Typically, before the installation, the venue dimensions are considered and the user objectives (e.g., loudness and spectral smoothness) are defined and prioritized. From this information, the optimal loudspeaker count and angular orientation or splay angles are determined. The line array is then assembled and deployed in the venue. Correction filters are often applied to each of the speakers to better achieve defined user objectives for the line array installation. These corrections typically vary for each speaker, because the filters also depend on the splay angles between each speaker. The process for obtaining the information needed for the desired audio processing and ultimate performance of the line array can be difficult and labor intensive to obtain with sufficient accuracy.

SUMMARY

The present technology provides a line array assembly with a smart hanging system that overcomes drawbacks of the prior art and provides other benefits.

DETAILED DESCRIPTION

Figure 1:
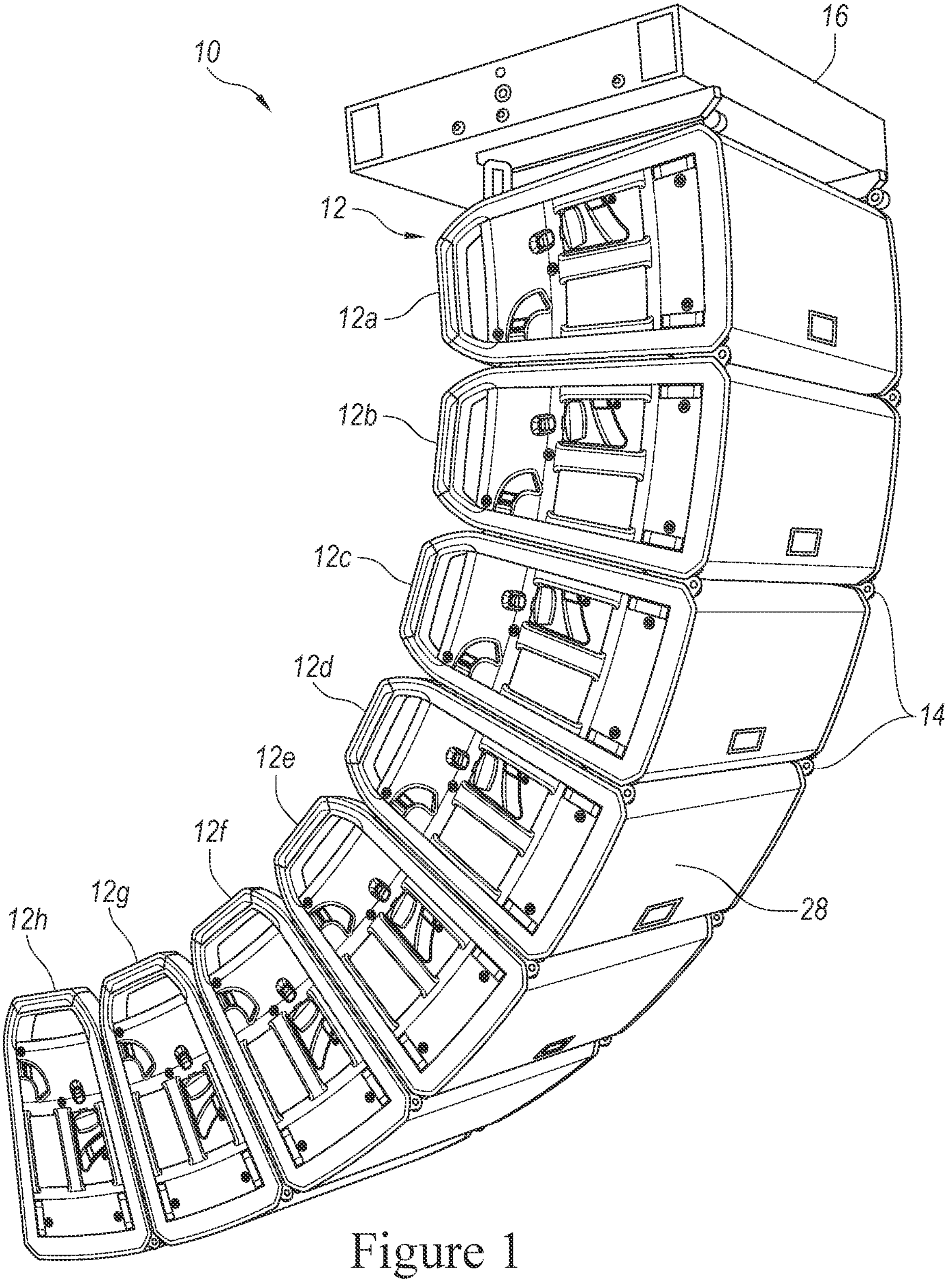
FIG. 1 is an isometric view of a line array assembly in accordance with one or more embodiments of the present technology.

The present disclosure describes a line array assembly with a smart hanging system in accordance with certain embodiments of the present invention. Several specific details of the invention are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Certain details are set forth in the following description and in FIGS. 1-23 to provide a thorough understanding of various embodiments of the present technology. In other instances, well-known structures, materials, operations and/or systems often associated with building materials, building material support components and systems, building structures, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be overtly and specifically defined as such in this Detailed Description section. Unless the context clearly requires otherwise, as used herein the terms "about." "generally." "substantially" and "approximately" refer to values within 10% of the stated value. In instances in which relative terminology is used in reference to something that does not include a numerical value, the terms are given their ordinary meaning to one skilled in the art.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the present technology. Accordingly, other embodiments can have other details, dimensions, angles, and features without departing from the present disclosure. In addition, those of ordinary skill in the art will appreciate that further embodiments of the present technology can be practiced without several of the details described below. In the Figures, identical reference numbers identify identical, or at least generally similar, elements.

FIG. 1 is an isometric view of a line array assembly 10 with a smart hanging system in accordance with one or more embodiments of the present technology. The line array assembly 10 has a plurality of speakers 12 releasably interconnected to each other in a generally linear arrangement with each speaker positioned above and/or below one or more adjacent speakers 12. For example, the top-most speaker **12*a* is in the top position or "Position 1," and the second speaker 12*b* just below the top-most speaker 12*a* is in "Position 2." Similarly, the third speaker 12*c* is in "Position 3" is below the second speaker 12*b*, the fourth speaker 12*d* is in "Position 4" below the third speaker, and so on, such that the "$n^{th}$" speaker is in "Position n" within the array. In FIG. 1, the line array assembly 10 has eight speakers 12, wherein speakers 12*a*-12*h* are in Positions 1-8, respectively. Each of the second through seventh speakers 12*b*-12*g*** has an adjacent above speaker in the immediately-above position and an adjacent below speaker in the immediately-below position.

It is noted that, for purposes of discussion, the embodiments described below are in the context of a line array assembly 10 that is hung generally "vertically" downwardly from an upper structure. It is to be understood, however, that the line array assembly 10 in accordance with the present technology can be stacked upwardly from a lower supporting structure or can be positioned and/or supported generally horizontally, or at any other selected angle as may be suitable for a selected venue or installation.

The illustrated speakers 12 in the line array assembly 10 each have an engagement system 14 that allow each speaker 12 to releasably connect to the next-above speaker 12 and to the next-below speaker 12. For the speaker **12*a* in Position 1, the engagement system 14 allows the speaker 12*a* to connect to support rack 16 or other support systems from which the line array assembly 10 can hang or otherwise be supported. As discussed in greater detail below, the speakers 12 each have an adjustable hanger assembly that allows each speaker 12 to be positioned at a selected angle relative to vertical, and relative to the one or more other of the speakers 12 to which it is attached. Each speaker 12 within the line array assembly 10 can be adjustably positioned with an angular splay orientation relative to the adjacent speaker 12, and an angular inclination orientation relative to vertical (e.g., relative to a front face 28 of each speaker 12). The engagement system 14 is also configured to enable a single user to adjust and hang the speakers 12 in a selected arrangement to provide the desired splay and inclination angles of the speakers 12 for the particular venue. Accordingly, the line array assembly 10 can be safely assembled and adjusted with minimum man-power (i.e., a single user). Similarly, the engagement system 14 can be easily and safely released, so the single user can also quickly disconnect and disassemble the line array assembly 10**, such as during a "tear down" process at the end of an event in a venue or the like.

Figure 2:
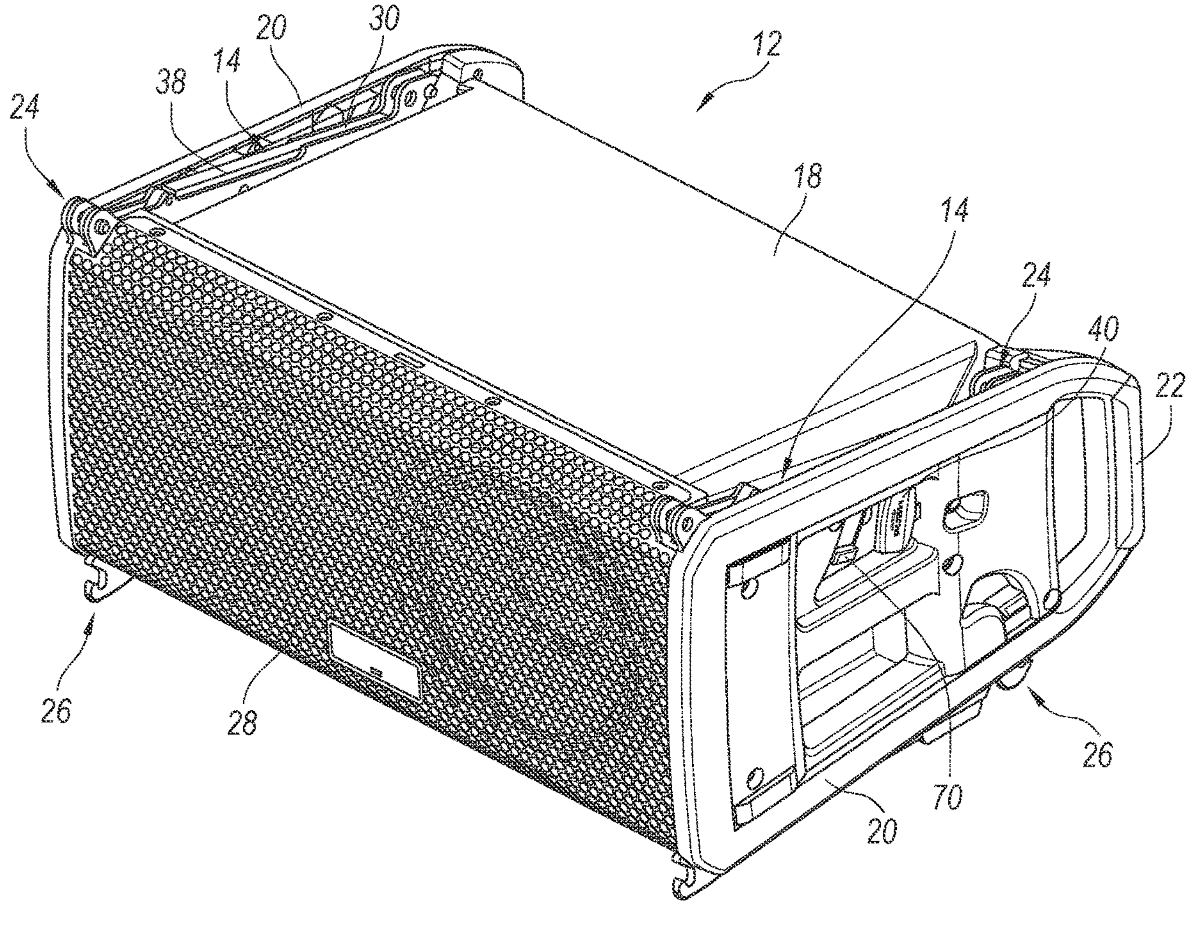
FIG. 2 is a top isometric view of a speaker assembly shown removed from the line array of FIG. 1.
Figure 3:
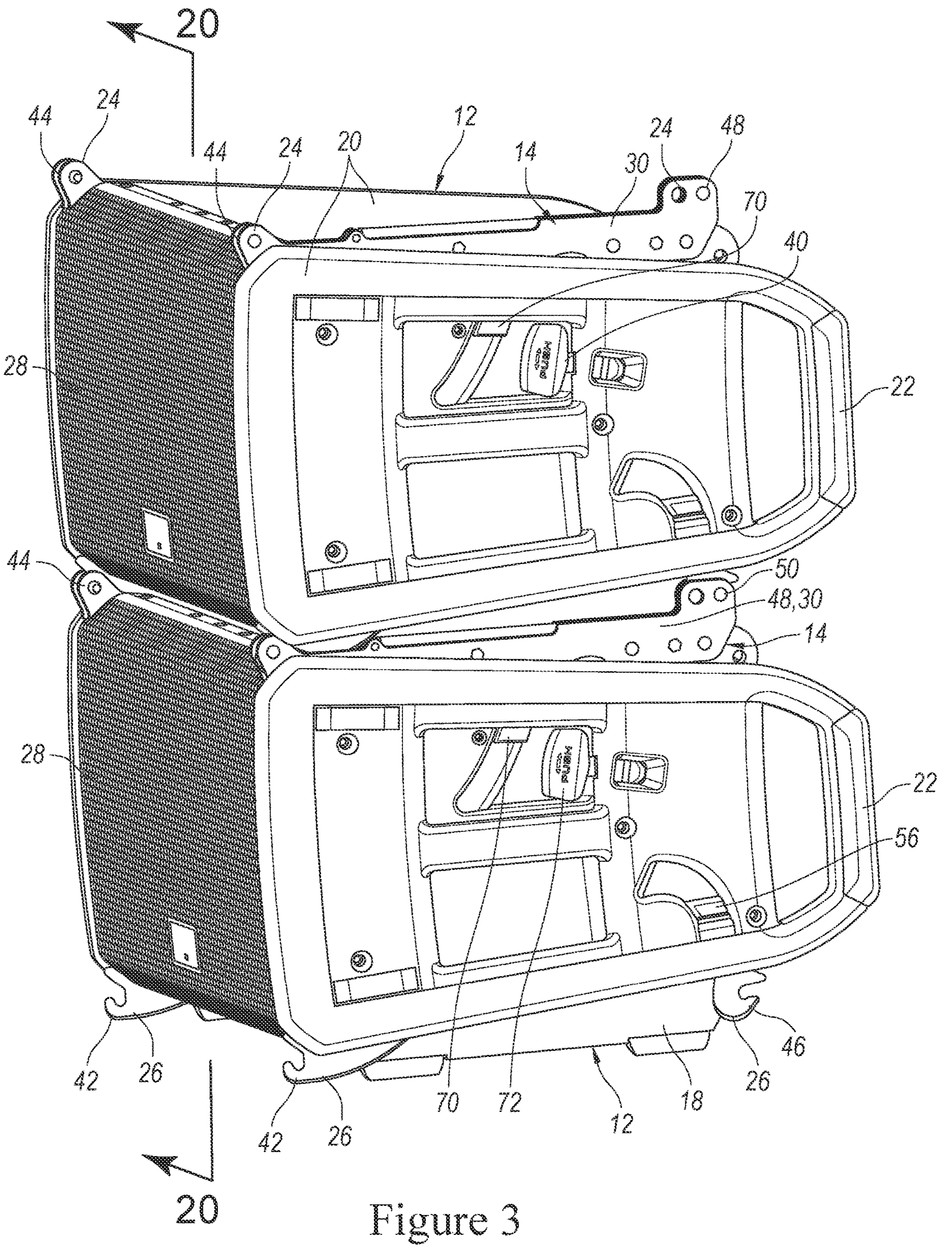
FIG. 3 is a side an isometric view of two speakers of the line array of FIG. 1 shown interconnected and oriented at approximately a 0-degree angle relative to each other.

Each speaker 12 in the line array assembly 10 of the illustrated embodiment has the same construction as the other speakers and each speaker 12 can be connected to any one of the other speakers in a next-above position or a next-below position. Accordingly, the description of a speaker 12 herein is applicable to any of the other speakers in the line array assembly. FIG. 2 is a top isometric view of one of the speakers 12 shown removed from the line array assembly 10 of FIG. 1. The speaker 12 has a body portion or cabinet 18 that contains the one or more drivers, cones, electronics, associated components, etc. A pair of end panels 20 are connected to the left and right ends of the cabinet 18. In the illustrated embodiment, each end panel 20 has an integrated handle 22 that a user can grasp, such as to carry the speaker 12, or to install or adjust the speaker in the line array assembly 10. The speaker 12 has an engagement system 14 on the opposing left and right ends of the cabinet 18. The engagement system 14 is shown captured between the cabinet 18 and the end panels 20. In other embodiments, some of the components of the engagement system 14 can be integral with ends of the cabinet 18 or the end panels 20. As seen in FIGS. 2 and 3, and as discussed in greater detail below, the engagement system 14 provides upper connection points 24 adjacent to the upper front and rear corner portions of the speaker 12 for releasably attaching to the bottom of the next-above speaker 12 or to the support rack 16 (see FIG. 1). The engagement system 14 also provides lower connection points 26 adjacent to the lower front and rear corner portions of the speaker 12 for releasably attaching to the top of the next-below speaker 12, if any.

The engagement system 14 on a speaker 12 is adjustable to change the angular orientation of the speaker 12 relative to the next-above speaker 12. (Compare, e.g., the splay angle between the two speakers 12 in FIG. 3 and FIG. 4.) For example, engagement system 14 is configured so the upper connection points 24, such as the rear upper connection points, are vertically adjustable relative to the end panels 20. FIG. 3 is an isometric view of two speakers 12 with the engagement system 14 of the lower speaker adjusted to a fully raised position. When the engagement system 14 of a lower speaker 12 is in the fully raised position, the upper connection points 24 of that lower speaker 12 releasably engage the lower connection points 26 of the next-above speaker 12. The engagement system 14 holds that lower speaker 12 so its front face 28 is approximately coplanar (i.e., at a splay angle in the range of approximately 0°-3°) relative to the front face 28 of the next-above speaker 12.

Figure 4:
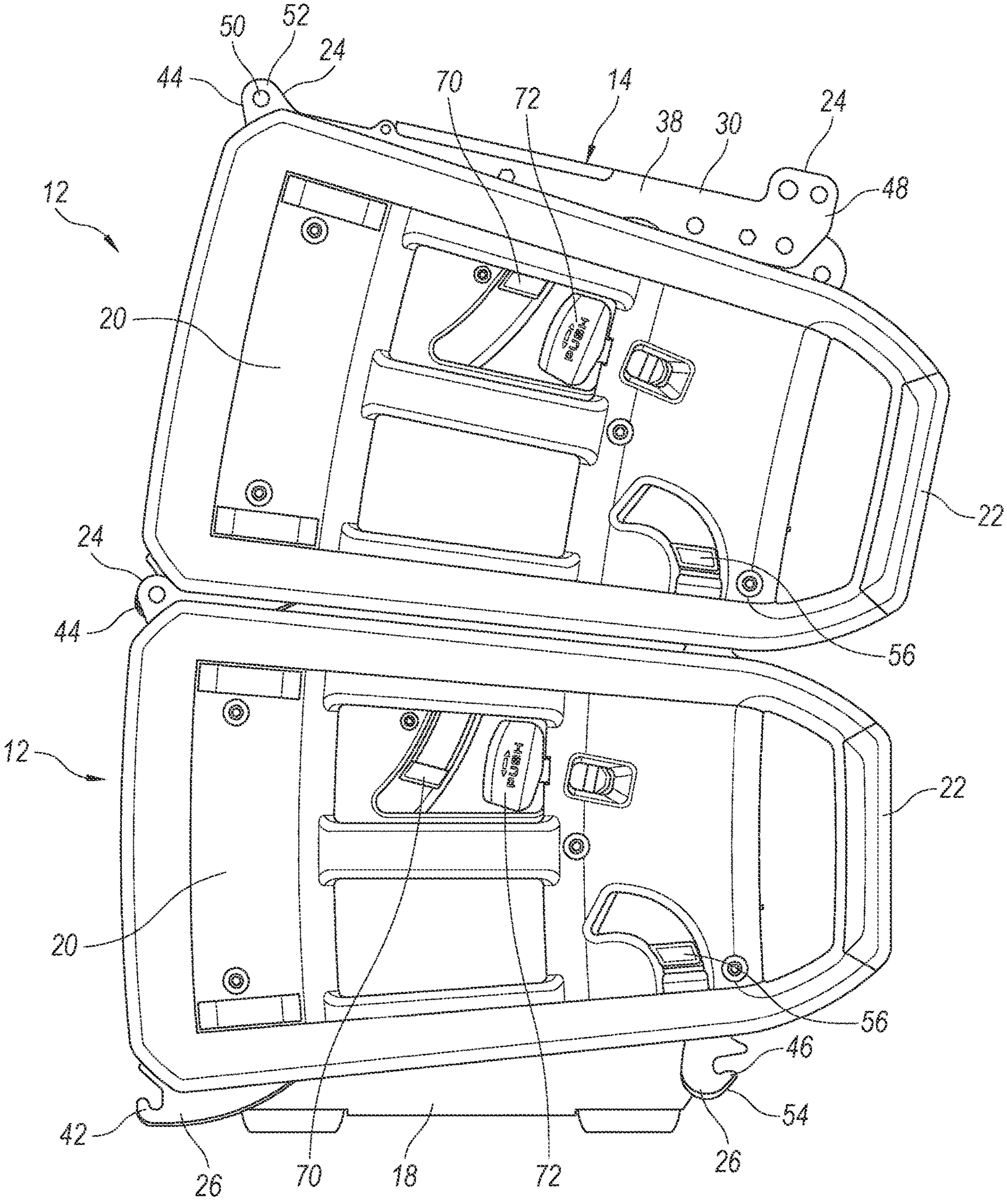
FIG. 4 is a side elevation view of the two speakers of FIG. 3 shown oriented at approximately a 12-degree angle relative to each other.

FIG. 4 is a side elevation view of the two speakers 12 of FIG. 3 with the engagement system 14 of the lower speaker adjusted to a fully lowered position. In this arrangement, the upper connection points 24 of a lower speaker 12 releasably engage the lower connection points 26 of the next-above speaker 12, and the engagement system 14 holds the lower speaker 12 so its front face 28 is at a selected angle relative to the front face 28 of the next-above speaker 12. In the illustrated embodiment of FIG. 4, the engagement system 14 is configured to hold the lower speaker 12 at a splay angle in the range of approximately 12° relative to the front face of next-above speaker. FIG. 4 shows a splay angle of approximately 12°, although other embodiments can be configured with the engagement system 14 that holds a speaker 12 at a different range of angles relative to the next-above speaker 12. The engagement system 14 also has one or more intermediate positions between the fully raised and fully lowered positions, so the engagement system 14 holds the lower speaker at an intermediate angle relative to the next-above speaker 12.

The engagement system 14 of each speaker 12 is adjustable independent of the position of the next-above or next-below speaker 12. For example, the engagement system 14 of the speakers in some positions within the line array assembly 10, such as the speakers 12*a-c* in Positions 1, 2, and 3 (FIG. 1), can be in the fully raised position with a splay angle relative to the next-above speaker 12 of approximately 0°. The engagement systems 14 of the one or more next speakers in the array, such as the speakers 12*d-f* in Positions 4, 5, and 6 (FIG. 1), can be in one or more intermediate positions with a splay angle of, for example, approximately 6°. The engagement systems 14 of the one or more next speakers in the array, such as the speakers 12*g-h* in Positions 7 and 8 (FIG. 1), can be in the fully lowered position, with a splay angle of approximately 12°. In this embodiment, the speakers 12*a-h* in the line array assembly 10 would form generally a "J-shape," or a spiral-line array. This is only one, non-limiting example of a possible speaker arrangement possible with the adjustable engagement systems 14. In another arrangement, the adjustable engagement systems 14 of all of the speakers can be in the fully raised position, so the speakers are positioned generally in a straight-line array. In another embodiment, the adjustable engagement systems 14 of all of the speakers can be in the same intermediate position or the fully lowered position, so the speakers are positioned generally in a circular-line array.

Figure 5:
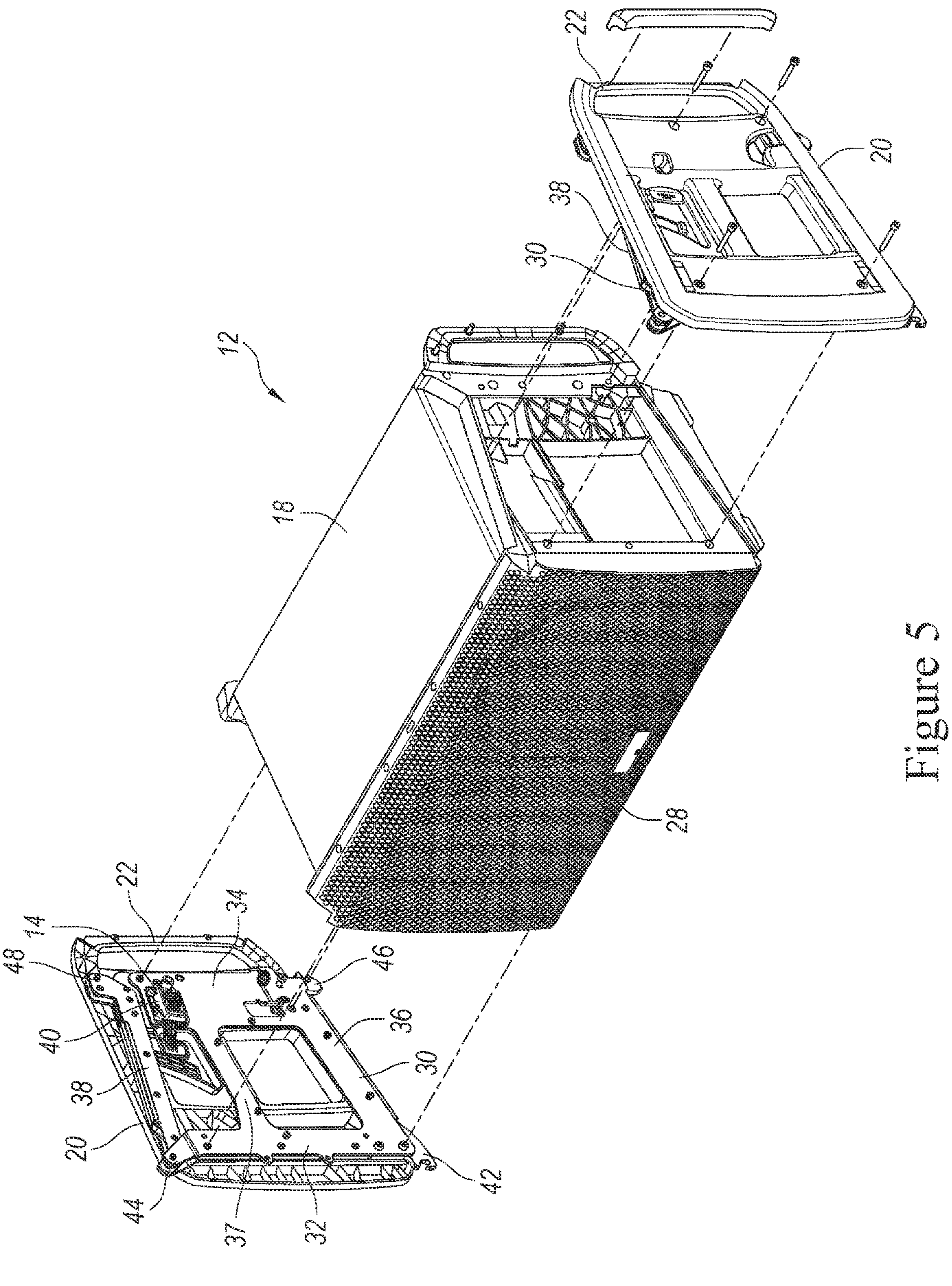
FIG. 5 is a partially exploded top isometric view of the speaker of FIG. 2.

FIG. 5 is a partially exploded top isometric view of the speaker of FIG. 2 with the adjustable engagement system 14 and end panels 20 shown separated from the speaker's cabinet 18. The adjustable engagement system 14 of the illustrated embodiment includes a rigid, adjustable hanger assembly 30 mounted on each end of the speaker's cabinet 18 and sandwiched between the respective end panel 20 and the cabinet 18. The engagement system 14 also includes an auto-pin locking mechanism 40 connected to the adjustable hangar assembly 30 to releasably lock the adjustable hangar assembly 30 in the fully raised position, the fully lowered position, or in one or more intermediate positions between the fully raised and fully lowered positions.

Figure 6:
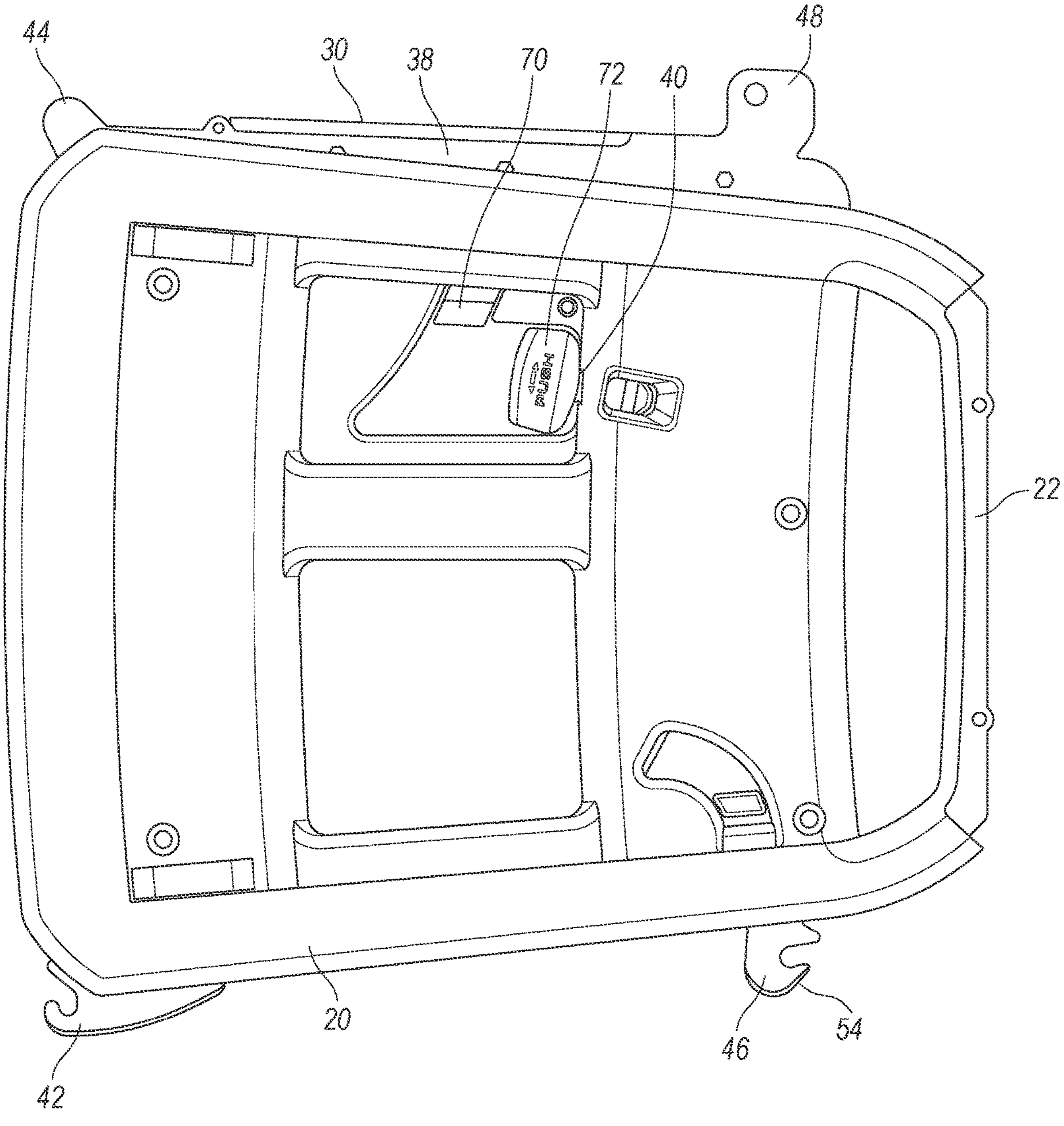
FIG. 6 is a side elevation view of an adjustable hanger assembly and end panel shown removed from the speaker assembly of FIG. 2.
Figure 7:
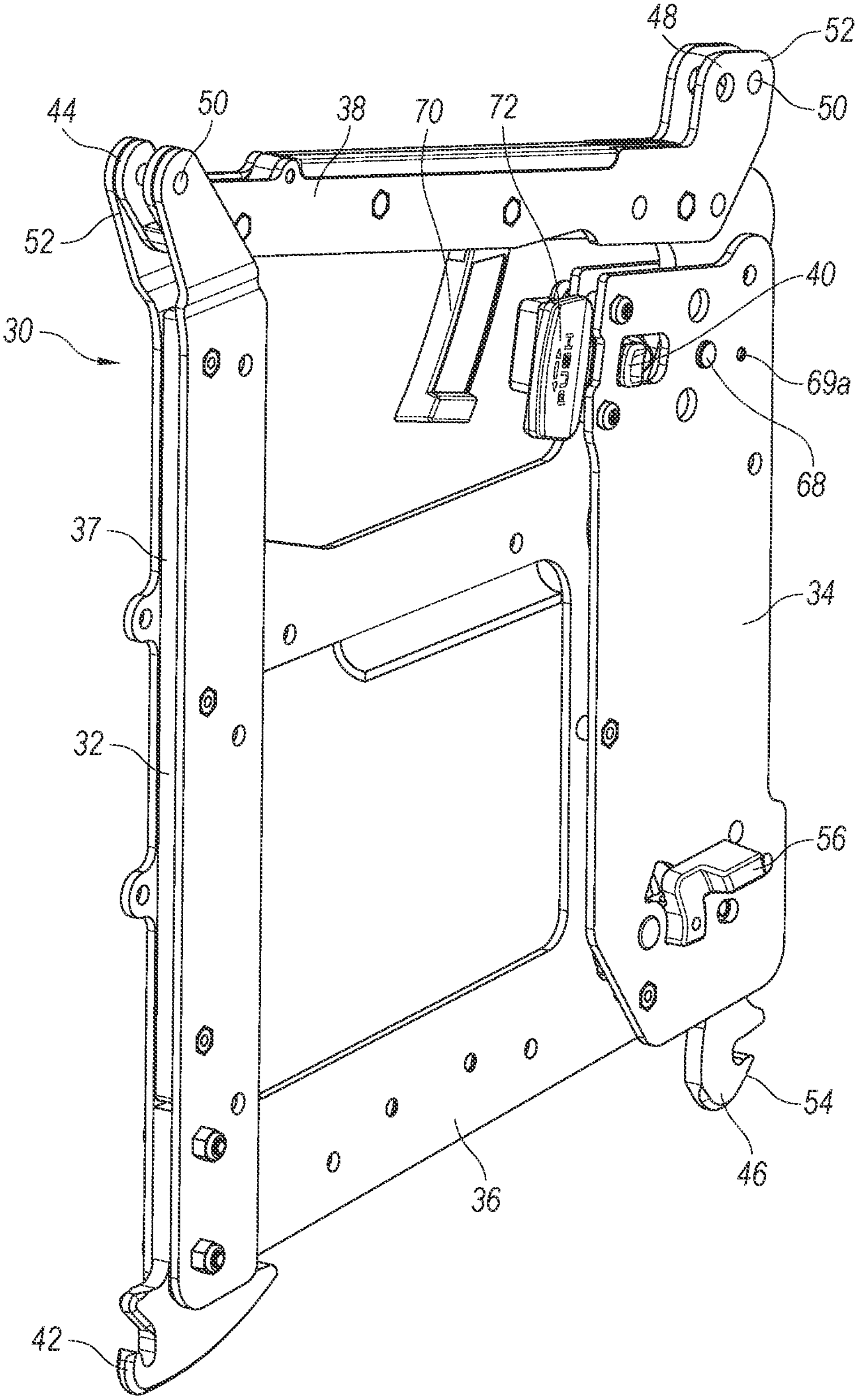
FIG. 7 is an isometric view of the adjustable hanger assembly shown removed from the end panel and speaker of FIG. 6.
Figure 8:
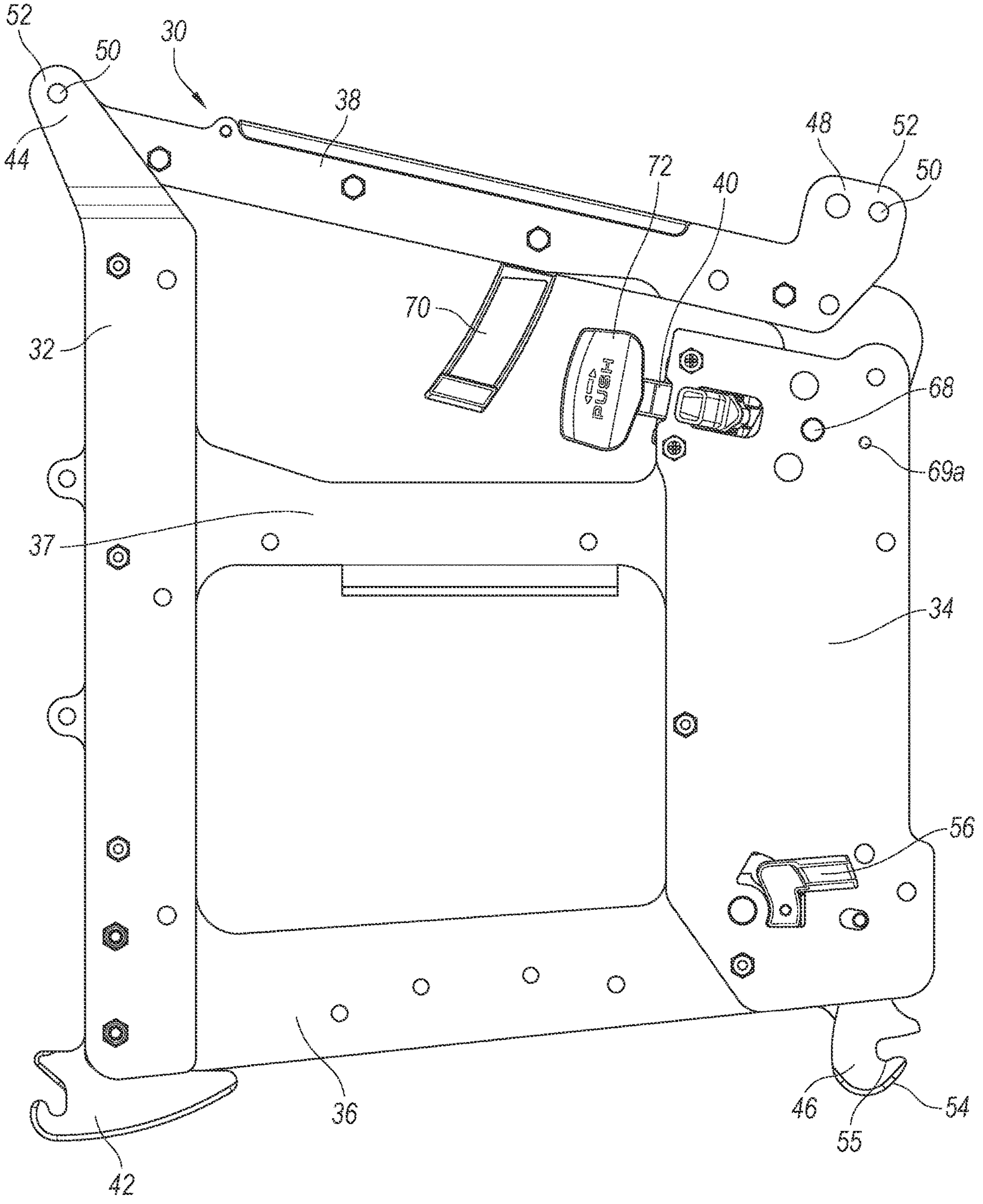
FIG. 8 is a side elevation view of the adjustable hanger assembly of FIG. 7 with a boom arm positioned in a lower-most position.

FIG. 6 is a side elevation view of the end panel 20 and adjustable hanger assembly 30 shown removed from the speaker's cabinet 18, and FIGS. 7 and 8 are isometric and side elevation views of the adjustable hanger assembly 30 shown removed from the end panel 20. The adjustable hanger assembly 30 of the illustrated embodiment includes a front vertical strut 32 positioned adjacent to the front face 28 of the speaker's cabinet 18 (FIG. 5). A rear vertical strut 34 is spaced apart from the front vertical strut 32 and positioned adjacent to the rear portion of the speaker cabinet 18 (FIG. 5), and a bottom strut 36 extends between the front and rear vertical struts 32 and 34 adjacent to the bottom of the speaker cabinet 18. An intermediate strut 37 that extends between the vertical front and rear struts 32 and 34 generally parallel to the bottom strut 36 can be used to provide rigidity to the adjustable hanger assembly 30. An adjustable top boom arm 38 extends between the front and rear vertical struts 32 and 34 and is movable relative to at least one or both of the front and rear vertical struts 32 and 24.

In the illustrated embodiment, the front end of the boom arm 38 is pivotally attached to the top end portion of the front vertical strut 32, so the rear end portion of the boom arm 38 can move generally vertically relative to the top end portion of the rear vertical strut 34. When the engagement system 14 is in the fully raised position (i.e., at the 0° position), the rear end of the boom arm 38 is in the upper-most position relative to the top end portion of the rear vertical strut 34. When the engagement system 14 is in the fully lowered position (i.e., at the 12° position), the rear end of the boom arm 38 is in the lower-most position relative to the rear vertical strut 34. When the engagement system is in the intermediate position (i.e., at the 6° position), the rear end of the boom arm 38 is between the upper-most and lower-most positions. As discussed in greater detail below, the auto-pin locking mechanism 40 is coupled to the vertical rear strut 34 and configured to releasably engage the rear end portion of the boom arm 38 to releasably retain the boom arm 38 in the fully raised, fully lowered, or intermediate positions.

The adjustable hanger assemblies 30 on the opposing ends of each speaker 12 in the line array 10 are configured to connect at its top corners to the next-above speaker 12 or the support rack 16 and to connect at its bottom corners to the next-below speaker 12 (FIG. 1). In the illustrated embodiment, each hanger assembly 30 has a bottom front hook 42 coupled to the bottom of the front vertical strut 32 and/or to the front of the bottom strut 36. An upper front strike 44 is coupled to the top of the front vertical strut 32 and/or to the front of the boom arm 38. A bottom rear hook 46 is movably coupled to the bottom of the rear vertical strut 34 and/or to the rear end of the bottom strut 36, and an upper rear strike 48 is coupled to the rear end portion of the boom arm 38.

When speakers 12 are assembled to form the line array 10 (FIG. 1), the upper front and rear strikes 44 and 48 on a speaker 12 releasably engage the respective bottom front and rear hooks 42 and 46 of the next-above speaker (or hooks or other engagement members on the support rack 16). Similarly, the bottom front and rear hooks 42 and 46 of the speaker releasably engage the upper front and rear strikes 44 and 48 of the next-below speaker 12. In the illustrated embodiment as shown in FIG. 7, each front and rear strike 44 and 48 includes a strike pin 50 extending between a pair of spaced apart strike plates 52, and the strike pin 50 is configured to fit into and releasably engage the respective bottom front or rear hook 42 or 46 of an adjacent speaker's hanger assembly 30. In other embodiments, the front and/or rear strikes 44 and 48 can have other configurations, such as an aperture in a plate or the like, for releasable engagement with the bottom front and/or rear hooks 42 and 46.

Each hanger assembly 30 of a speaker 12 is configured to lockably and releasably connect to the next-below speaker 12 (FIG. 1). In the illustrated embodiment, the bottom rear hook 46 is movable relative to the bottom and rear vertical struts 36 and 34 between an engage position and a retract position. The bottom rear hook 46 is also urged toward the engage position by a spring 62 (FIG. 9) or other biasing member that pushes or pulls against the bottom rear hook 46. When a speaker 12 is attached to the next-above speaker 12 (FIG. 1), a single user can lift the speaker and position it adjacent to the bottom of the next-above speaker. The user positions the upper front strikes 44 on each end of the speaker onto the bottom front hooks 42 of the next-above speaker 12 (FIG. 4), such that the speaker is hanging from and securely supported by the next-above speaker. The user can then pivot the speaker 12 about its upper front strikes 44 supported on the next-above speaker's 12 bottom front hooks 42 to bring the speaker's 12 upper rear strikes 48 into engagement with the next-above speaker's 12 bottom rear hooks 46.

When the speaker 12 is pivoted into engagement with the rear portion of the next-above speaker 12, the biased bottom rear hooks 46 of the next-above speaker 12 are in the engage position. The upper rear strikes 44 of the speaker 12 engage and press against a sloped cam surface 54 (FIG. 8) on the bottom of the bottom rear hooks 46 of the next-above speaker 12. As the strike pin 50 of each upper rear strike 44 move upwardly, pressing against the cam surface 54, the bottom rear hook 46 pivots away from the engage position toward the retracted position (e.g., toward the front vertical strut 32) until the strike pin 50 clears the end of the cam surface 54. The bottom rear hook 46 of the next-above speaker then snaps or is otherwise urged back (e.g., away from the front vertical strut 32) to the engage position to capture the strike pin 50 in the saddle 55 (FIG. 8) of each bottom rear hook 46 of the upper speaker. The speaker 12 is then fully supported by its upper front and rear strikes 44 and 48 on the respective lower front and rear hooks 42 and 46 of the next-above speaker. Once the lower rear hooks 46 snap into engagement with the mating upper rear strikes 48, the mating upper and lower hanger assemblies 30 are releasably locked together with the speaker 12 securely hanging from the bottom of the next-above speaker 12. This arrangement of the adjustable hanger assemblies 30 with the upper front and rear strikes 44 and 48 releasably hanging on the lower front and rear hooks 42 and 46, respectively, of the next-above speaker (or the support rack 16) allows a user to quickly, easily, and safely hang the speakers 12 during installation of the line array assembly 10.

Figure 9:
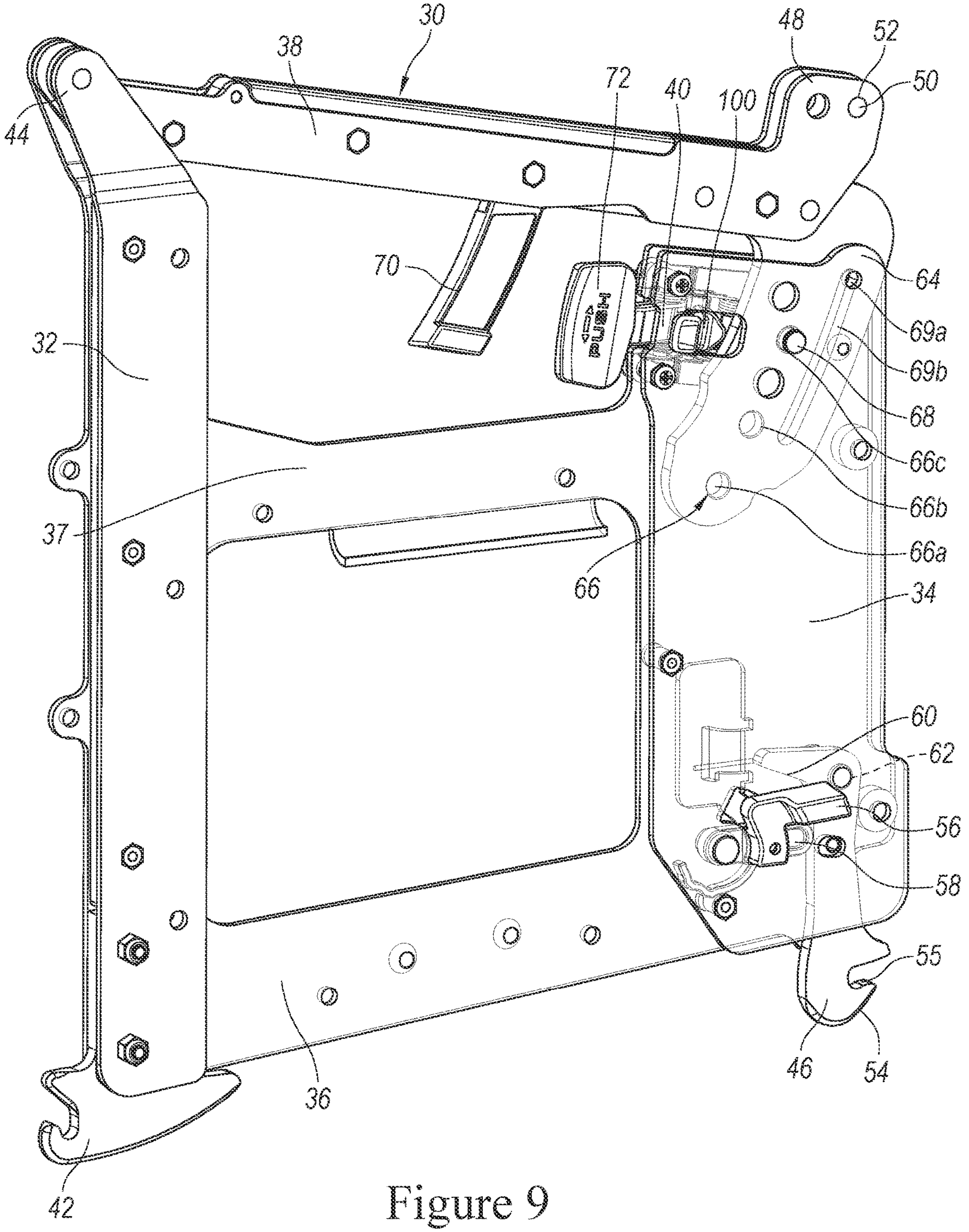
FIG. 9 is a side isometric view of the adjustable hanger assembly of FIG. 7.

The adjustable hanger assemblies 30 can be configured to lock the associated speaker 12 together so the speakers 12 in the line array assembly 10 will not unintentionally separate from each other once interconnected. As seen in FIG. 9, each adjustable hanger assembly 30 of the illustrated embodiment has a lock selector 56 coupled to the rear vertical strut 34 adjacent to the pivotal bottom rear hook 46. The lock selector 56 is movable between a locked position, an unlocked position, and a disengaged position. In the locked position, a blocking portion 58 of the lock selector 56 is positioned to block the bottom rear hook 46 from pivoting away from the engage position toward the retracted position. In the unlocked position, the blocking portion 58 of the lock selector 56 is positioned to allow the bottom rear hook 46 to move between the engage and retracted positions, such as when two adjacent speakers are being connected together.

When the lock selector 56 is moved to the disengaged position, the blocking portion 58 pushes against a sloped upper portion 60 of the bottom rear hook 46 that causes the bottom rear hook 46 to pivot and move to the retracted position. When the lock selector 56 moves the bottom rear hook 46 to the retracted position, such as when two adjacent speakers 12 are connected together, the bottom rear hook 46 will move away from and disengage from the upper rear strike 48 of the next-below speaker 12 and allow the speaker 12 to pivot on the other speaker's 12 bottom front hook 42. The user can then easily and quickly lift the next-below speaker 12 off and away from the above speaker 12. Although the lock selector 56 of the illustrated embodiment has three positions, other embodiments can include a lock selector 56 with a different number of positions. For example, the lock selector 56 can be movable between the locked position and unlocked position, and a separate actuator can be used to move the bottom rear hook 46 to the retracted position.

As indicated above, the engagement system 14 of each speaker 12 is adjustable to allow a user to select the splay angle of a speaker 12 relative to the next-above speaker or relative to the support rack 16. Moving the engagement system 14 between the fully raised and fully lowered positions changes the splay angle of the speaker 12 relative to the next-above speaker. In the illustrated embodiment, the engagement system 14 moves between the fully raised and fully lowered positions by adjusting the angle of the boom arm 38 of each adjustable hanger assembly 30 of the associated speaker 12. The front end of the boom arm 38 is pivotally connected to the front vertical strut 32, and the rear portion of the boom arm 38 moves generally vertically through an arc relative to the vertical rear strut 34, thereby changing the angle of the boom arm 38 relative to the vertical front and rear struts 32 and 34.

As seen in FIG. 9, the rear portion of the boom arm 38 has an adjustment plate 64 with a plurality of registration holes 66 arranged in an arc. As the boom arm 38 pivots, the adjustment plate 64 moves along an arc adjacent to the upper portion of the vertical rear strut 34. The auto-pin locking mechanism 40 is mounted to the upper portion of the vertical rear strut 34 adjacent to the adjustment plate 64. The auto-pin locking mechanism 40 has a locking pin 68 configured to extend through a selected one of the registration holes 66 that aligns with the locking pin 68 when the boom arm 38 is in a selected angular orientation and position (i.e., the upper-most position, the intermediate position, or the lower-most position).

An additional safeguard can be provided, for example, in the unlikely event that the auto-pin mechanism 40 or the locking pin 68 fail to engage. In the illustrated embodiment of FIG. 9, a fixed, permanent pin 69*a* extends from the rear vertical strut 34 and rides in arc-shaped slot 69*b* in the adjustment plate 64. The pin 69*a* and slot 69*b* are positioned and configured to block the boom arm 38 from moving upwardly beyond the allowable smallest splay angle or downwardly beyond the allowable largest splay angle. Other embodiments can use other position-blocking features to restrict movement of the boom arm 38 in the event the locking pin 68 is not properly captured in a registration hole 66.

When the locking pin 68 is in the extended, angle-locked position and extends through the registration holes 66 in the adjustment plate 64 connected to the boom arm 38, the locking pin 68 blocks the adjustment plate 64 from moving relative to the vertical rear strut 34, thereby locking the boom arm 38 in the selected angle. When the locking pin 68 is in the retracted, angle-adjust position, the locking pin 68 is disengaged from the registration holes 66 and the adjustment plate 64, so the boom arm 38 and adjustment plate 64 can be pivoted to a selected angular orientation.

In the illustrated embodiment, when the locking pin 68 of the auto-pin locking mechanism 40 is aligned with and extended through the upper most registration hole 66*c*, the boom arm 38 is set for the greatest splay angle (e.g., 12°), so the engagement system 14 is in the fully lowered position. When the locking pin 68 is aligned with and extended through the lower-most registration hole 66*a*, the boom arm 38 is set for the smallest splay angle (e.g., 0°), so the engagement system 14 is in the fully raised position. When the locking pin 68 is aligned with and extended through the middle registration hole 66*b*, the boom arm 38 is set for an intermediate splay angle (e.g., 6°), so the engagement system 14 is in the intermediate position. Although the adjustment plate 64 of the boom arm 38 in the illustrated embodiment has three holes corresponding to the three positions of adjustable engagement system 14, the adjustment plate 64 in other embodiments can have a greater or fewer number of registration holes 66 to correspond to a greater or fewer number of angular positions (e.g., approximately 0°, 3°, 6°, 9°, 12°, etc.) of the engagement system 14 for each speaker 12.

In some embodiments, as seen in FIGS. 4, 7, and 9, the boom arm 38 can be connected to an adjustment tab 70 that is at least partially accessible through the end panel 20 (FIG. 4) covering the associated adjustable hanger assembly 30. The adjustment tab 70 is positioned and configured to be grasped or otherwise engaged by a user to assist in raising or lowering the boom arm 38 to adjust the position of the engagement system 14 between the fully raised, intermediate, and fully lowered positions. This adjustment tab 70 allows a user to quickly and easily adjust the engagement system 14 to the selected orientation before the user hangs the speaker 12 within the line array assembly 10. In some embodiments, the adjustment tab 70 has markings or other indicia such to visually indicate to the user at which of the positions the engagement system 14 is positioned.

As seen in FIGS. 5 and 7, the auto-pin locking mechanism 40 is mounted or otherwise coupled to the inside surface of at least one of a speaker's 12 adjustable hanger assemblies 30 and is substantially covered and protected by the vertical rear strut 34 and the end panel 20 covering the associated hanger assembly 30. In the illustrated embodiment, each speaker 12 has two auto-pin locking mechanisms 40, each attached to a respective one of the adjustable hanger assemblies 30. Each auto-pin locking mechanism 40 has a release paddle 72 that is exposed through openings in the end panel 20 (FIG. 6), so a user can grasp the release paddle 72 and actuate the auto-pin locking mechanism 40 to adjust the angular orientation of the boom arm 38 with the adjustment tab 70, thereby adjusting the splay angle of the speaker 12 prior to or when it is installed in the line array 10.

Figure 10:
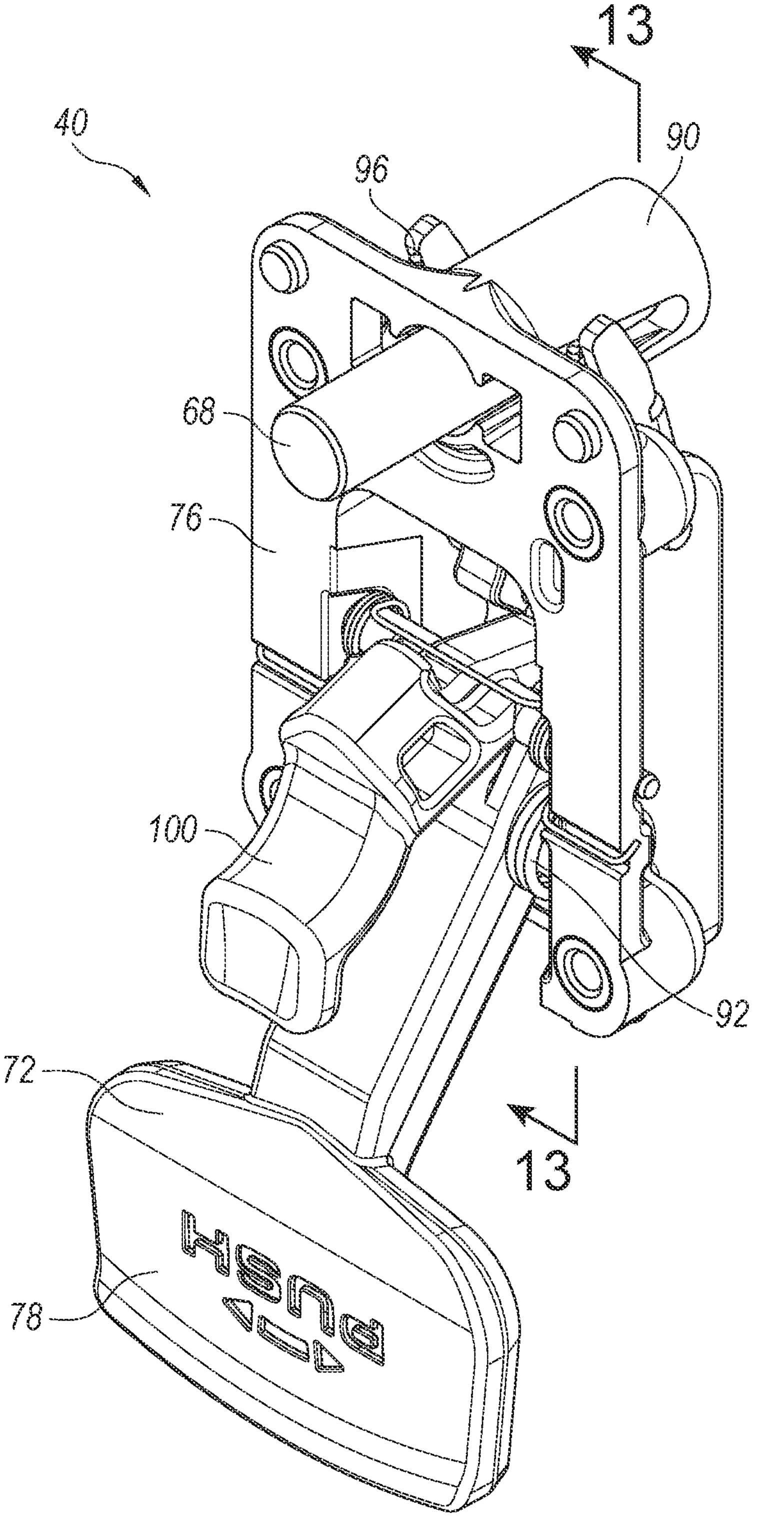
FIG. 10 is a front isometric view of an auto-pin locking mechanism shown removed from the adjustable hanger assembly of FIG. 7 with a locking pin in the extended, angle-locked position.
Figure 11:
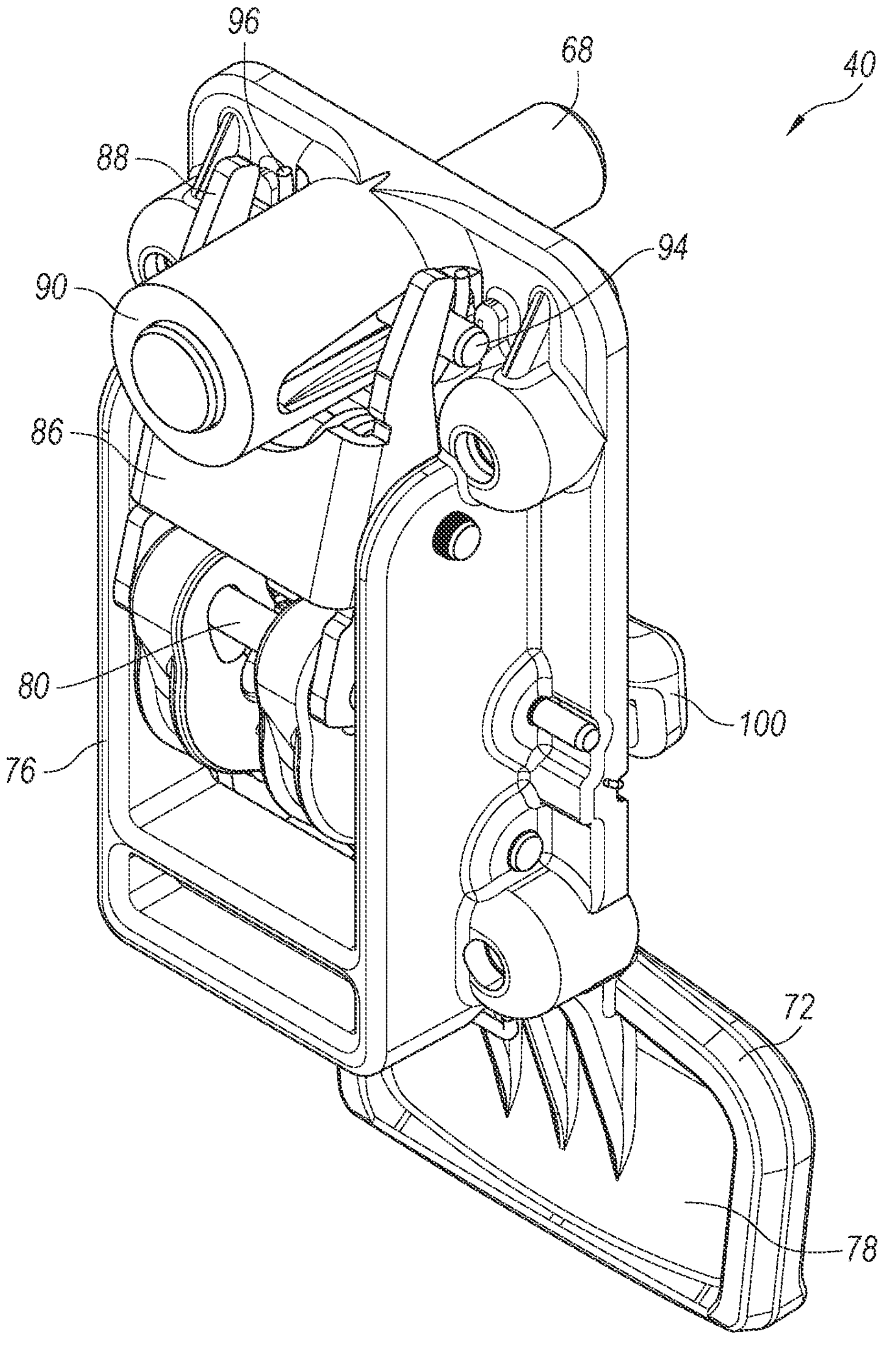
FIG. 11 is a rear isometric view of the auto-pin locking mechanism of FIG. 10 with the locking pin shown in the extended, angle-locked position.
Figure 12:
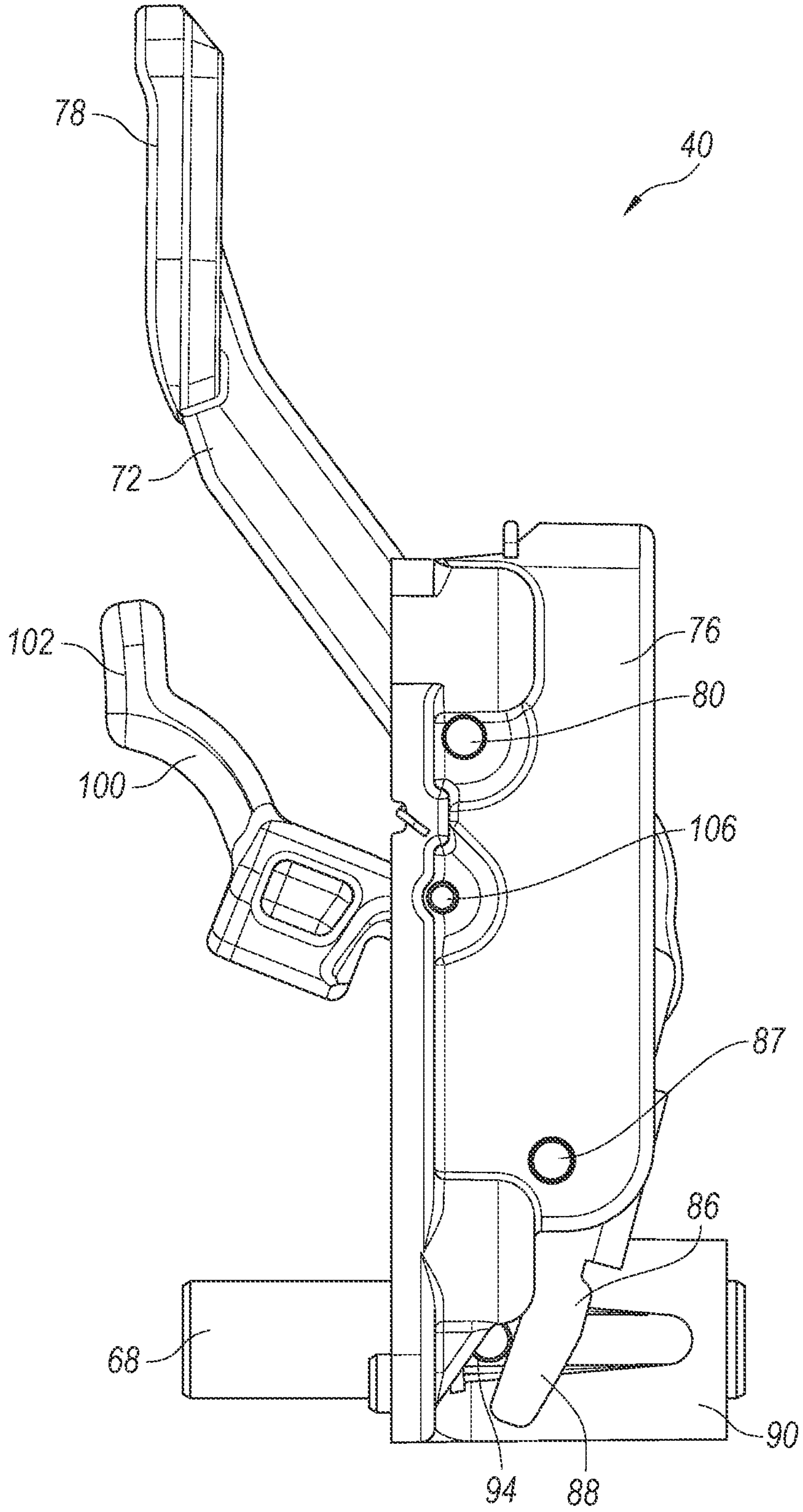
FIG. 12 is a side elevation view of the auto-pin locking mechanism of FIG. 10 with the locking pin shown in the extended, angle-locked position.
Figure 13:
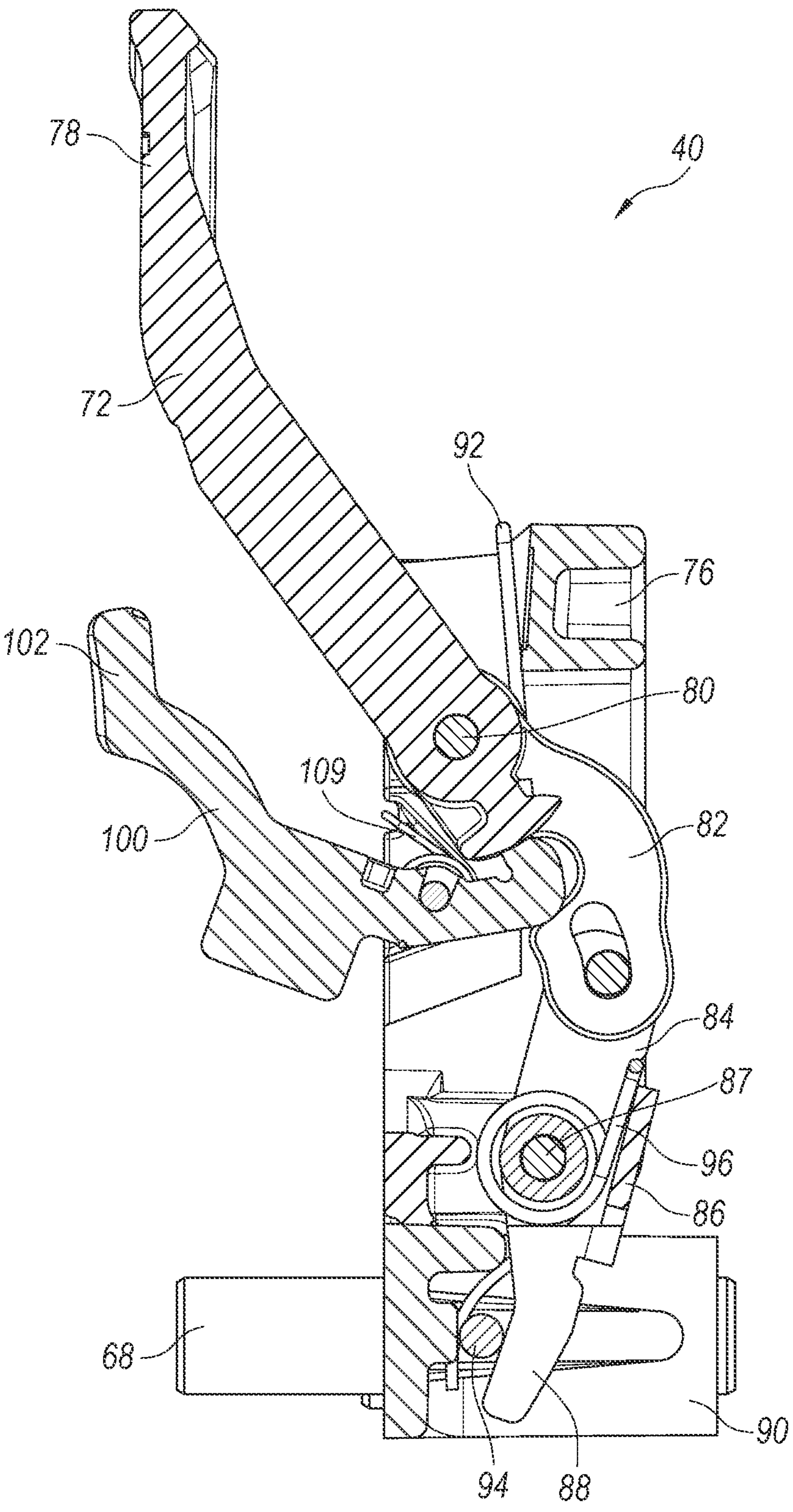
FIG. 13 is a partial cross-sectional view of the auto-pin locking mechanism taken substantially along line 13-13 of FIG. 10.

FIGS. 10 and 11 are front and rear isometric views of the auto-pin locking mechanism 40 shown removed from the adjustable hanger assembly 30. FIGS. 12 and 13 are side elevation and partial cross-sectional views of the auto-pin locking mechanism 40. The auto-pin locking mechanism 40 of the illustrated embodiment has a housing 76 that mounts to the vertical rear strut 34 (FIG. 9). The release paddle 72 is pivotally connected to the housing 76 and configured to allow a user to push, depress, or otherwise move the release paddle 72 to cause the locking pin 68 to move between an extended, angle-locked position and a retracted, angle-adjust position.

Figure 14:
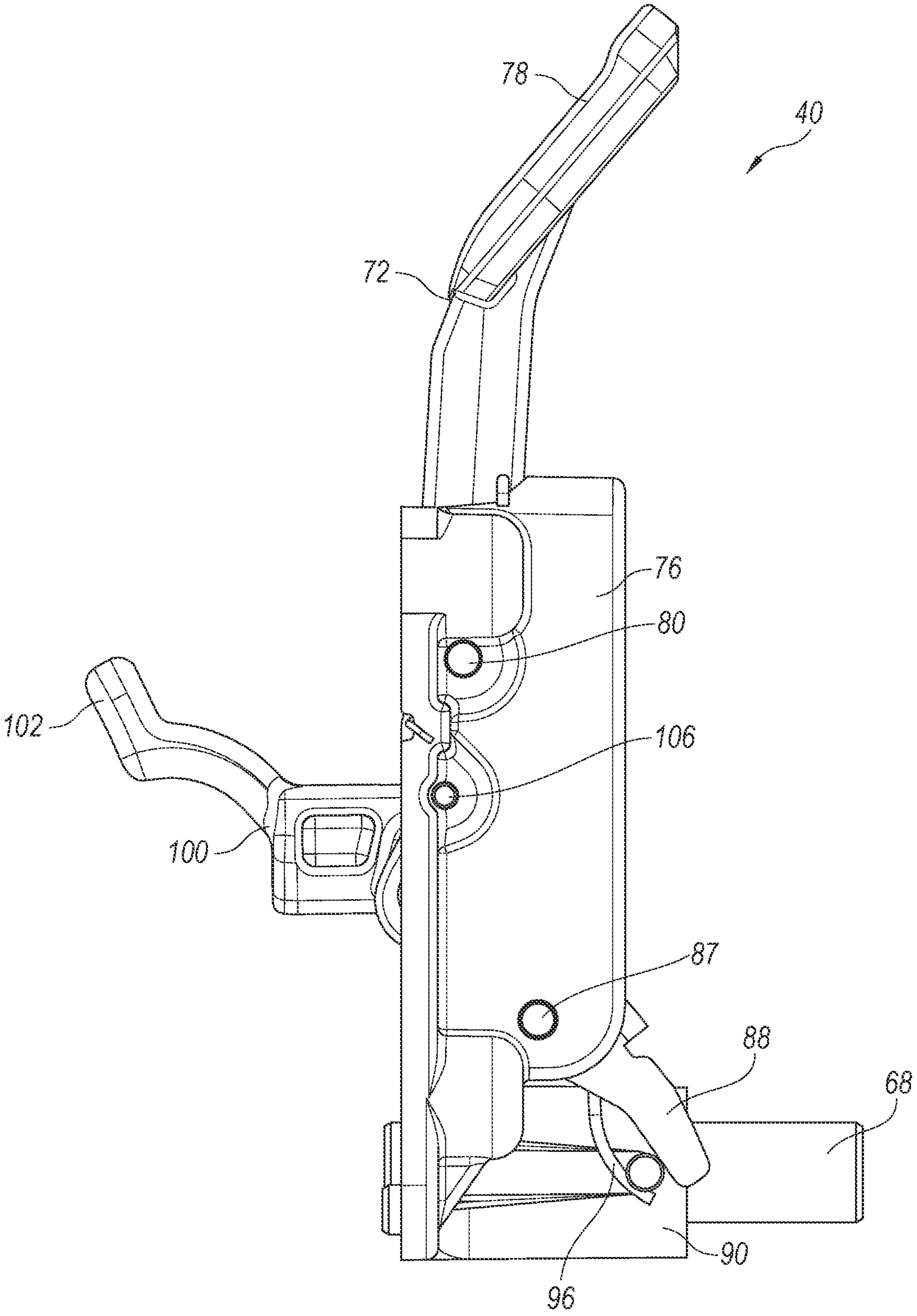
FIG. 14 is a side elevation view of the auto-pin locking mechanism of FIG. 13 with the locking pin shown in the retracted, angle-adjust position.
Figure 15:
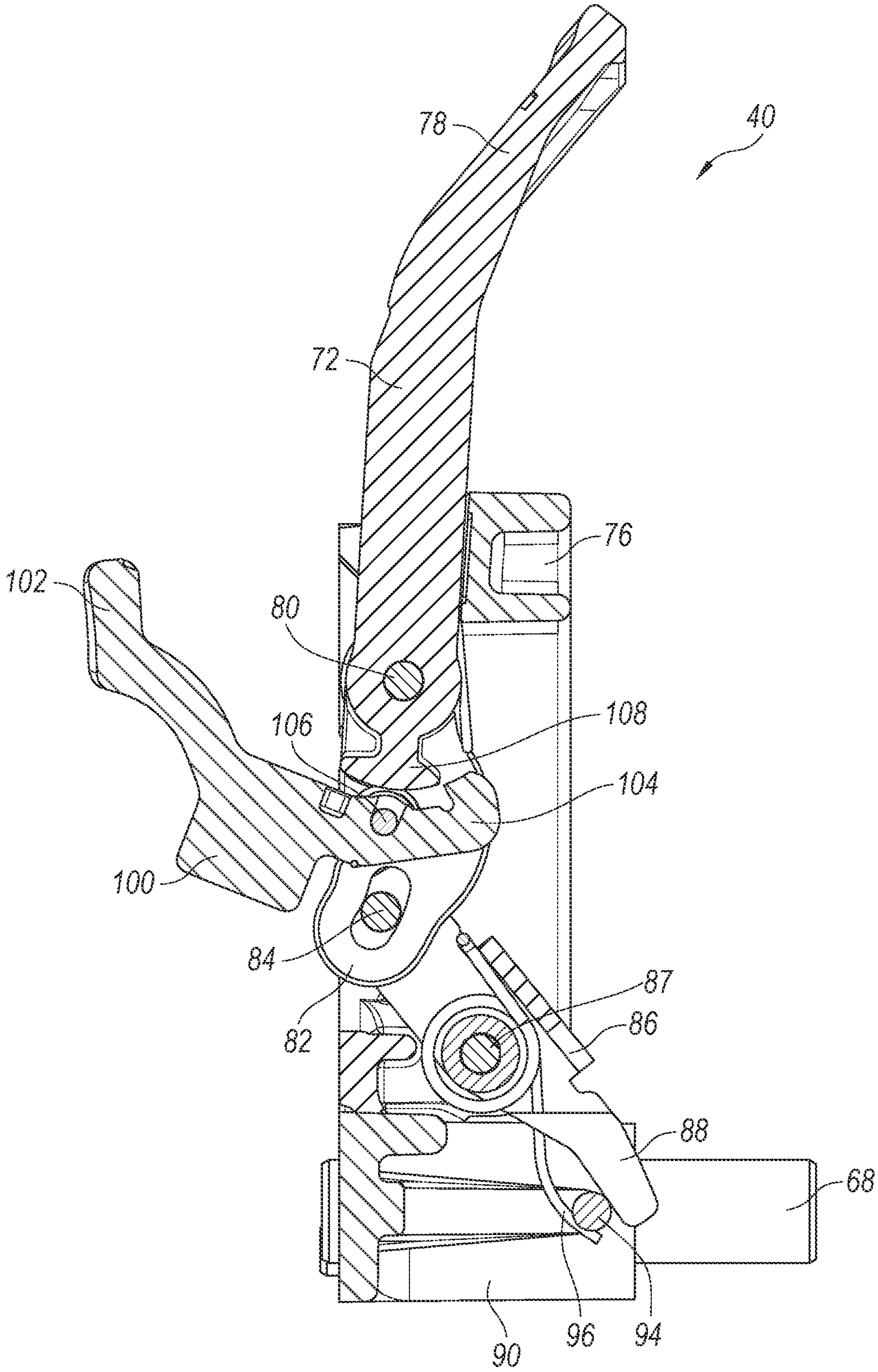
FIG. 15 is a partial cross-sectional view of the auto-pin locking mechanism of FIG. 13 with the locking pin in the retracted, angle-adjust position and a release paddle shown in the released position.

The release paddle 72 is movable relative to the housing 76 between a pin-extend position (FIGS. 12 and 13) and a pin-retract position (see FIGS. 14 and 15). In the illustrated embodiment, the release paddle 72 is urged toward the pin-extend position by a spring 92 or other biasing member coupled to the housing 76. The release paddle 72 has a handle portion 78 at its proximal end that a user can grasp to move the release paddle 72 and actuate the auto-pin locking mechanism 40. The release paddle 72 is connected to the housing 76 by a pivot pin 80 located between the handle portion 78 and a distal end 82 of the release paddle 72, such that when the release paddle 72 moves between the pin-extend and pin-retract positions, the distal end 82 of the release paddle 72 moves through an arcuate path. The distal end 82 of the release paddle 72 is connected to a proximal end 84 of a rocker arm 86 that is pivotally connected to the housing 76 by a pivot pin 87. A distal end 88 of the rocker arm 86 is engaged with the locking pin 68, which is contained and axially movable within an aperture 90 in the housing 76. When the release paddle 72 moves to the pin-extend position, the distal end 82 of the release paddle 72 rotates about the pivot pin 80 and causes the rocker arm 86 to pivot about the pivot pin 87, so the distal end 88 of the rocker arm 86 pushes on and causes the locking pin 68 to move axially within the aperture 90 to the extended, angle-locked position.

Figure 16:
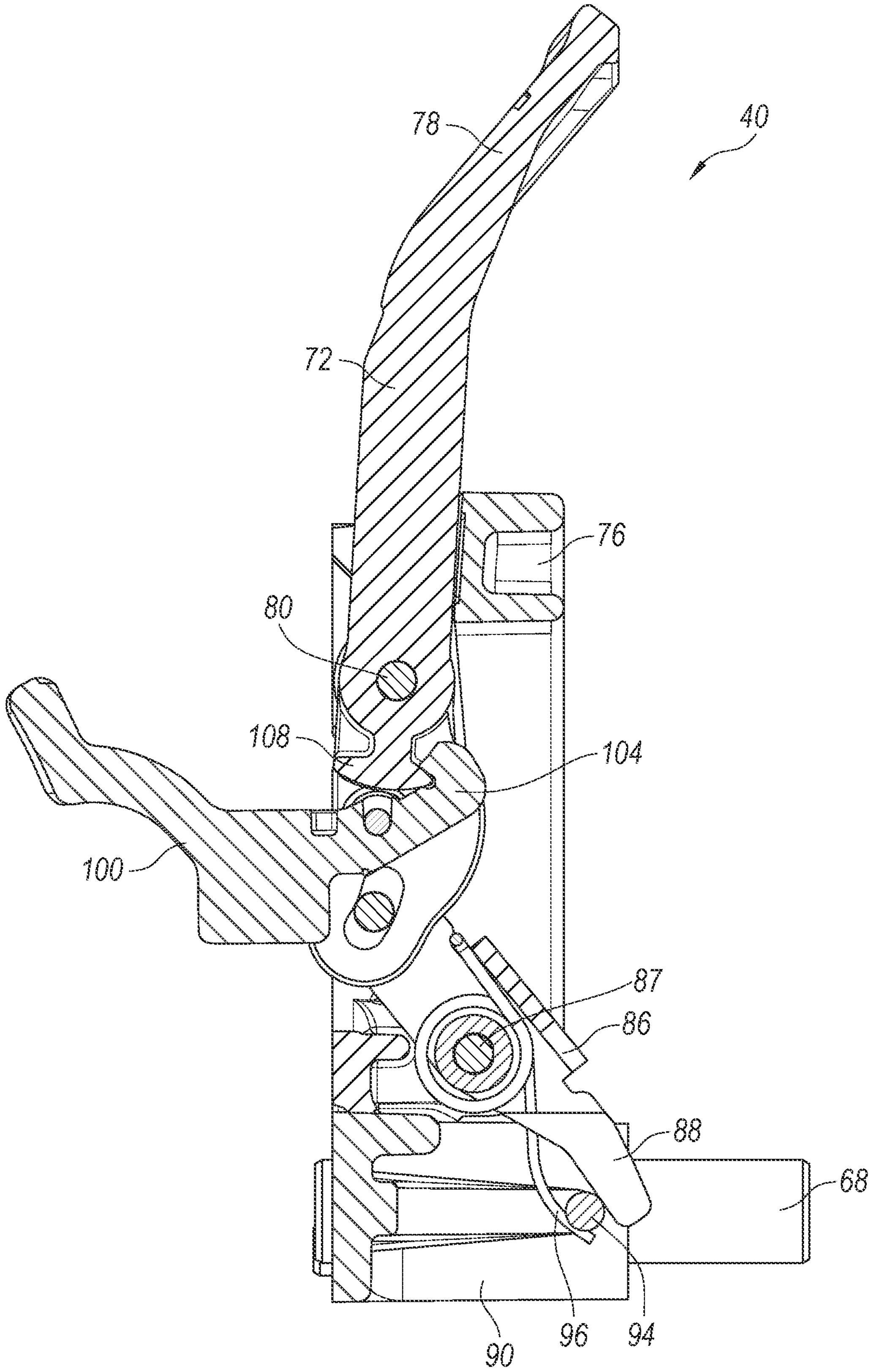
FIG. 16 is a partial cross-sectional view of the auto-pin locking mechanism of FIG. 13 with the locking pin shown in the retracted, angle-adjust position and the release paddle in the pin-extend position.

In the illustrated embodiment, the locking pin 68 has a projection 94 positioned to be engaged by the distal end 88 of the rocker arm 86 when the release paddle 72 is moved toward the pin-extend position. The distal end 88 of the rocker arm 86 can be configured to push against the projection 94 of the locking pin 68, but the rocker arm 86 is not fixed to the projection 94. As seen in FIGS. 14-16, when the release paddle 72 is moved to the pin-retract position, the distal end 82 of the paddle causes the rocker arm 86 to pivot, so the distal end 88 of the rocker arm 86 rotates to allow the locking pin 68 to move within the aperture 90 toward the retracted, angle-adjust position. When the locking pin 68 moves to the retracted, angle-adjust position, the locking pin 68 is withdrawn from the registration holes 66 in the adjustment plate 64 (FIG. 9), thereby allowing a user to change the angle of the boom arm 38 with the adjustment tab 70 to a selected position between the upper-most, intermediate, and lower-most positions, as discussed above.

In one embodiment, a spring 96 or other biasing member is coupled to the locking pin 68 and urges the locking pin 68 toward the retracted, angle-adjust position. It is noted that the release paddle 72 is urged toward pin-extend position, but the locking pin 68 is urged toward the retracted, angle-adjust position. The force generated by the spring 96 against the locking pin 68 is less than the force generated by the spring or other biasing member that urges the release paddle 72 toward the pin-extend position. Accordingly, the auto-pin locking mechanism 40 is overall biased toward the locking pin 68 being in the extended, angle-locked position.

In operation, a single user can adjust the selected splay angle for each speaker 12 in the line array assembly 10 by adjusting the engagement system 14 of the respective speaker 12 (FIG. 1) and then hang the speaker 12 on the support rack 16 or on the bottom of the next-above speaker 12. The engagement system 14 also allows a user to easily adjust the splay angle of a speaker after the speaker 12 has been hung in the line array assembly 10. The weight of the speaker 12 alone or in combination with the weight of other speakers 12 hanging below it are such that vertical loads are applied to each of the speaker's boom arms 38. This vertical load on the boom arm 38 pulls the adjustment plate 64 against the locking pin 68 extending through the selected registration hole 66, which creates a frictional engagement between the adjustment plate 64 and the locking pin 68. If a user were to intentionally or unintentionally push each release paddle 72 on a speaker from the pin-extend position to the pin-retract position (FIGS. 12 and 15), the release paddle 72 would rotate and cause the rocker arm 86 to pivot and move its distal end away from the projection 94 on the locking pin 68. The frictional engagement between the adjustment plate 64 and the locking pin 68 will hold the locking pin 68 in the extended, angle-lock position, even though the rocker arm 86 is no longer holding the locking pin 68 in the extended, angle-locked position. Accordingly, the auto-pin locking mechanism 40 will not accidently release the locking pin 68 and allow the spring 96 to move the locking pin 68 to the retracted, angle-adjust position when the speaker 12 is under load.

If the release paddles 72 were moved to the pin-retract position, and a user were to, for example, grasp the handles 22 of the speaker 12 on the end panels 20 (FIG. 1) and lift or pivot the speaker 12 to take the vertical load off of the boom arms 38, this would substantially release the frictional engagement between each adjustment plate 64 and the respective locking pin 68 extending through a registration hole 66. The spring 96 coupled to the locking pin 68 would then automatically snap the locking pin 68 out of the registration hole 66 to the retracted, angle-adjust position, thereby allowing the single user to change the position of the boom arm 38, which changes the splay angle of the speaker 12. Once the splay angle of the speaker 12 has been adjusted, the mechanism returns the release paddle 72 to the pin-extend position, so the locking pin 68 will extend through the selected registration hole 66 in the adjustment plate 64.

In one or more embodiments, the auto-pin locking mechanism 40 has a retention latch 100 movably coupled to the housing 76 and configured to releasably hold the release paddle 72 in the pin-retract position. As seen in FIG. 15, the retention latch 100 has a proximal end 102 spaced apart from the housing 76 and positioned for engagement by a user. A distal end 104 of the retention latch 100 is adjacent to a catch 108 on the release paddle 72. The retention latch 100 is pivotally coupled to the housing 76 by a pivot pin 106 between the retention latch's proximal and distal ends 102 and 104. The retention latch 100 is pivotable about the pivot pin 106 between a lever-release position (FIG. 15) and a lever-hold position (FIG. 16). When the retention latch 100 is in the lever-release position, the retention latch's distal end 104 is out of locked engagement with the catch 108, so as to allow the release paddle 72 to pivot between the pin-extend position and the pin-retract position.

In the illustrated embodiment, the retention latch 100 is urged toward the lever-hold position by a spring 113 (FIG. 13) or other biasing member. The distal end 104 of the retention latch 100 is configured to ride against a distal surface 112 of the catch 108 when the release lever 72 is out of the pin-retract position (FIG. 13). When the release paddle 72 is moved to the pin-retract position, as shown in FIG. 15, the catch 108 is moved to allow the spring 113 to pivot the retention latch 100 to the lever-hold position, as shown in FIG. 16. In this lever-hold position, the distal end 104 of the retention latch 100 extends over the catch 108 so as to block the release paddle 72 from moving out of the pin-retract position toward the pin-extend position. The lever-hold position can be used when adjusting the splay angle of the speakers 12 such that the release paddle 72 does not need to be held down while the adjustment is made (e.g., adjusting from the smallest splay angle to the largest splay angle while bypassing the intermediate splay angle, etc.)

Accordingly, after a user has depressed the release paddle 72 toward the pin-retract position by pushing on the handle portion 78, the retention latch 100 will retain the release paddle in the pin-retract position. The user can cancel a depression of the release paddle 72 by pushing on the distal end 104 of the retention latch 100 and moving it to the lever-release position, which releases the catch 108 and unlocks the release paddle 72 from the pin-retract position, as shown in FIG. 15. The biased release paddle 72 is then urged to return to the pin-extend position, which causes the locking pin 68 to move toward to the extended, angle-locked position. If the locking pin 68 is not yet aligned with a registration hole 66 in the adjustment plate 64 (FIG. 9), the locking pin 68 will press and ride against side of the adjustment plate 64 as the boom arm 38 pivots upwardly or downwardly until the locking pin 68 is aligned with a selected registration hole 66. As the locking pin 68 moves into alignment with a registration hole 66, the locking pin 68 will automatically snap into the registration hole 66 so as to lock the boom arm 38 in the corresponding position.

In the illustrated embodiment, the retention latch 100 is urged toward the lever-hold position by a spring 113 (FIG. 13) or other biasing member. The distal end 104 of the retention latch 100 is configured to ride against a distal surface 112 of the catch 108 when the release lever 72 is out of the pin-retract position. When the release paddle 72 is moved to the pin-retract position, as shown in FIG. 15, the catch 108 is moved to allow the retention latch 100 to pivot to the lever-hold position, as shown in FIG. 16. In this lever-hold position, the distal end 104 of the retention latch extends over the catch 108 so as to block the release paddle 72 from moving out of the pin-retract position toward the pin-extend position. A user can unlock the release paddle 72 from the pin-retract position by pushing on or otherwise engaging the proximal end 102 of the retention latch 100 and pivoting it back to the lever-release position, as shown in FIG. 15. The biased release paddle 72 is then free to return to the pin-extend position, which will cause the locking pin 68 to move to the extended, angle-locked position, such as when the locking pin 68 is aligned with a selected registration hole 66 in the adjustment plate 64 of the boom arm 38 (FIG. 9).

Figure 17:
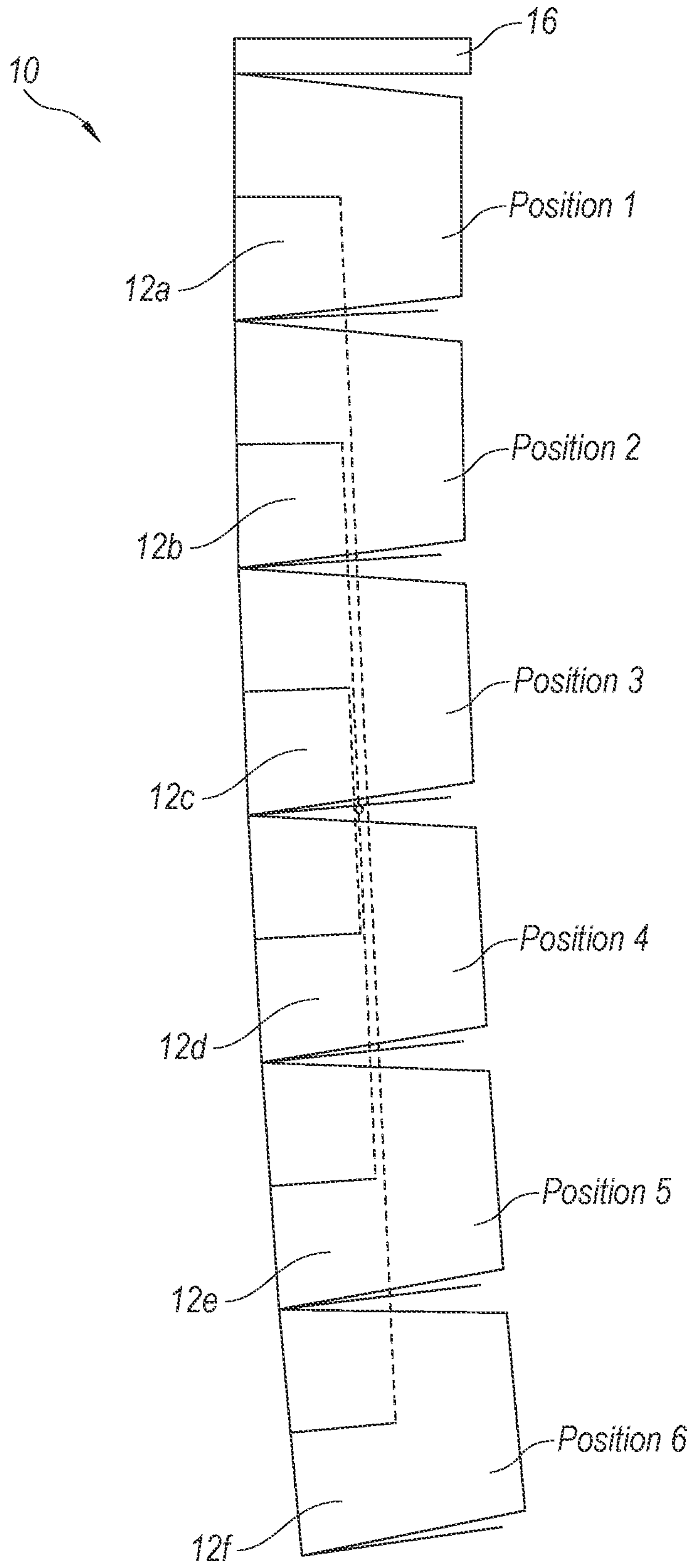
FIG. 17 is a schematic side elevation view of the line array assembly in accordance with one or more embodiments of the present technology, wherein the speakers in the array are arranged with the speakers in a straight alignment.

The engagement system 14 with the adjustable hanger assemblies 30 on the ends of each speaker 12 in the line array assembly 10 allows a single user to interconnect or disconnect the speakers 12 for use in a selected venue. The single user can also easily adjust the splay of each speaker 12 during assembly of the line array assembly 10, thereby controlling the total inclination or angular orientation of each speaker 12 relative to vertical. For example, if the engagement system 14 of each speaker 12 in a line array assembly 10 has a splay angle of approximately 0° when in the fully-raised position and all speakers 12 in the line array assembly 10 have the engagement system 14 at the fully-raised position, the front faces 28 of all of the speakers 12 will be essentially co-planar. FIG. 17 schematically illustrates a line array assembly 10 with six speakers 12*a-f*. If the engagement system 14 of each speaker 12 has a splay of angle of approximately 1° when in the fully raised position, all of the speakers 12*a-f* will have a 1° splay angle when the engagement system 14 of all six speakers are in the raised position. Further, the speaker 12*a* in Position 1 adjacent to the support rack 16 will have an inclination angle of 1°, and speakers 12*b-f* in the Positions 2-6 will have inclination angles of 2°, 3°, 4°, 5°, and 6-degrees, respectively.

Figure 18:
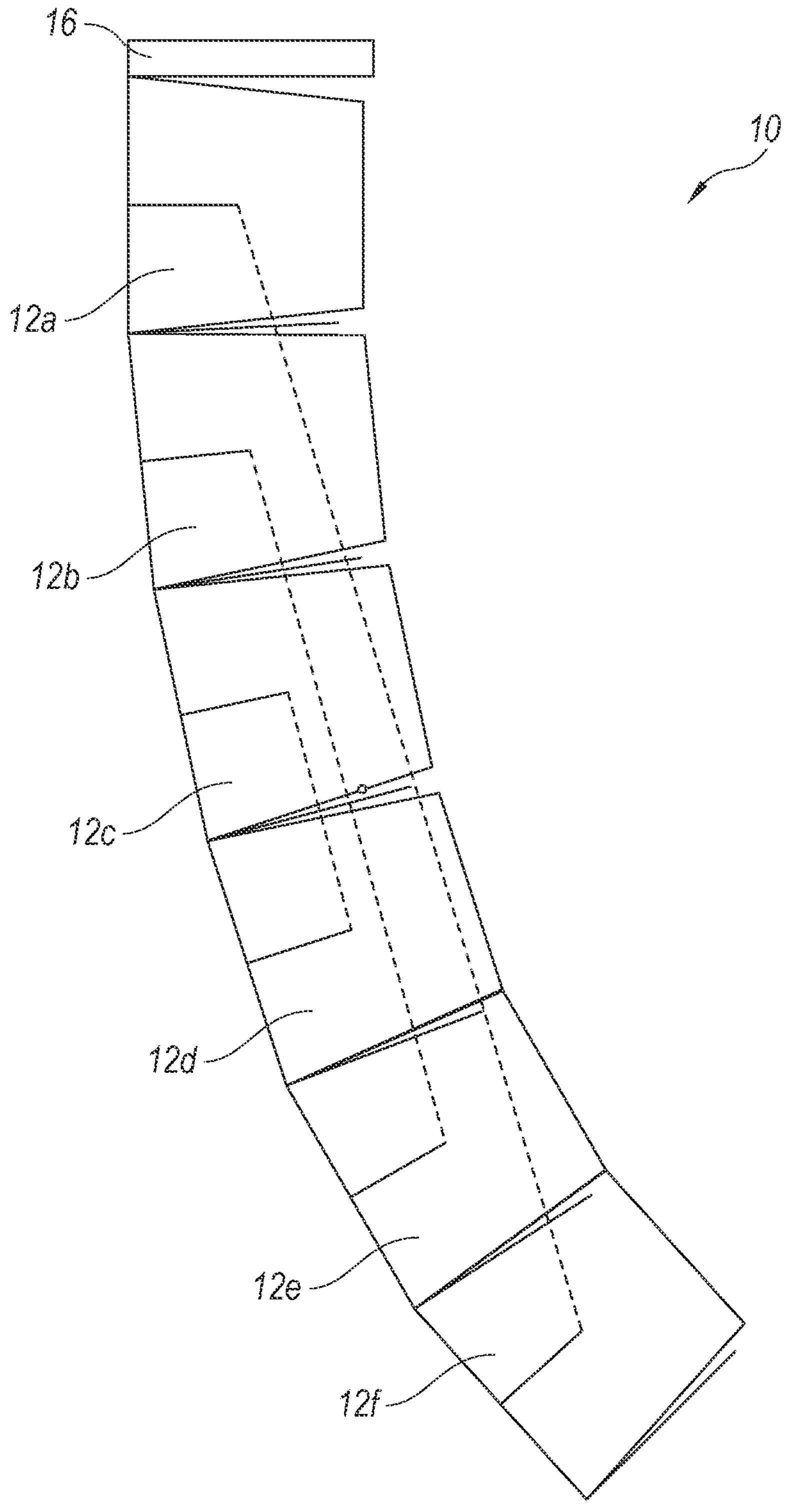
FIG. 18 is a schematic side elevation view of the line array assembly with the speakers arranged in spiral arrangement with a first set of speakers positioned at approximately a 6-degree splay, and a second set of speakers positioned at approximately a 12-degree splay.
Figure 19:
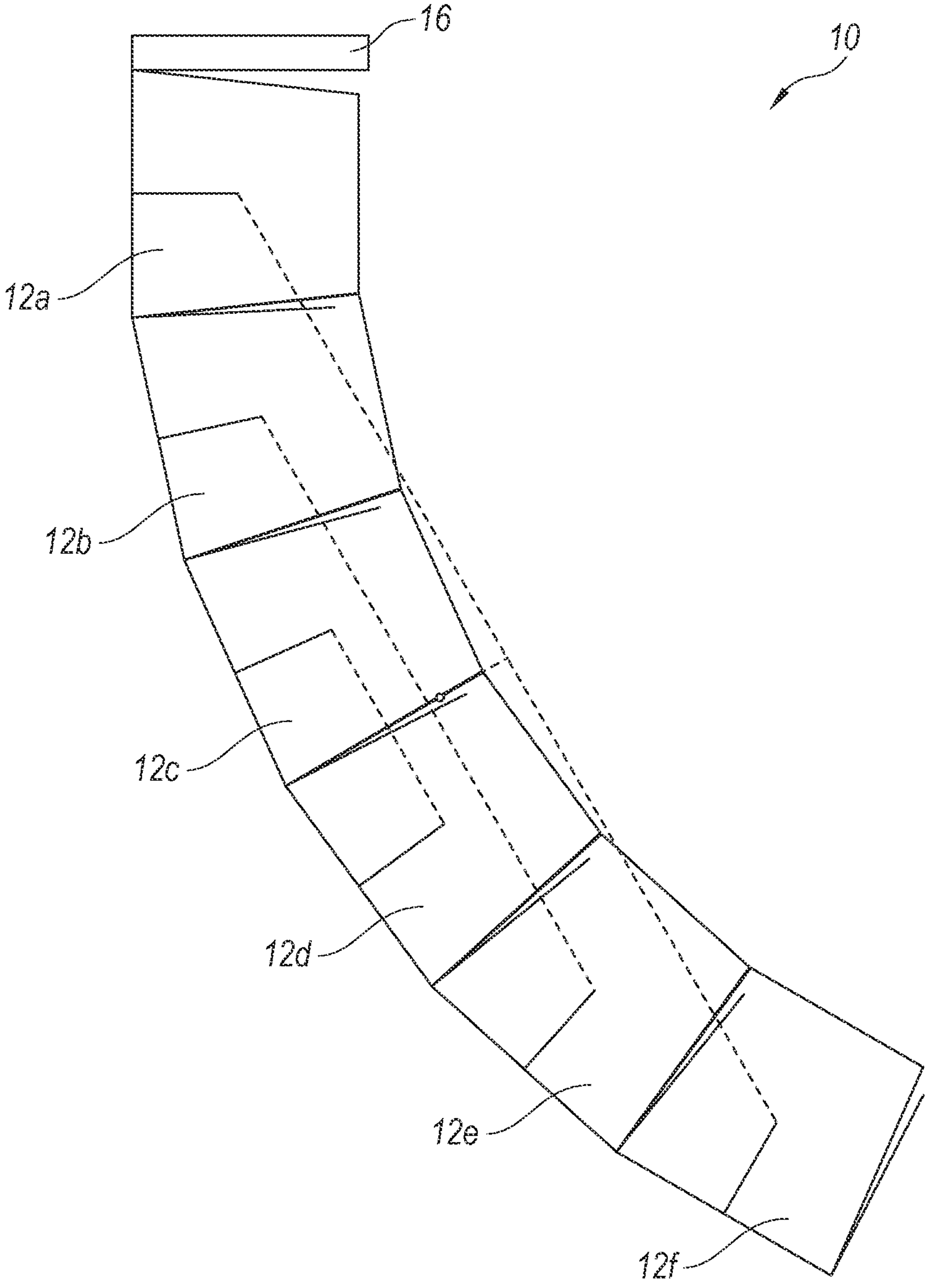
FIG. 19 is a schematic side elevation view of the line array assembly of FIG. 20 with the speakers arranged in a third, full-curved arrangement with the speakers positioned at approximately a 12-degree splay.

Referring to FIG. 18, the six speakers 12*a-f* of the line array assembly 10 are arranged in a partial spiral array, with the engagement systems 14 of the six speakers 12*a-f* positioned so the first speaker 12*a* has 1° splay angle, the speakers 12*b, c*, and *d* in Positions 2, 3, and 4 have each 6° splay angle, and the speakers 12*e* and *f* in Positions 5 and 6 each have a 12° splay angle. Accordingly, the inclination angles of the speakers 12*a-f* in this spiral line array assembly 10 will be 1°, 7°, 13°, 19°, 31°, and 43° respectively. When the six speakers 12*a-f* of the line array assembly 10 are arranged in a curved line array with a generally constant radius, as shown in FIG. 19, with the first speaker 12*a* having a 1° splay angle and all of other five speakers 12*b-f* having their engagement systems 14 in the fully lowered position with a splay angle of about 12°, the inclination angles of the speakers 12*a-f* in this curved array assembly will be 1°, 13°, 25°, 37°, 49°, and 61° respectively. These are only some examples of the potential arrangements of the speakers 12 of a line array assembly 10 in accordance with the present technology. The inclination angles of the speakers 12 can be different, for example, if the speaker 12*a* in Position 1 is hung from the support rack 16 with an inclination different than 1°. Further, the engagement systems 14 can be configured to have other positions for speaker arrangement with different splay angles relative to vertical, which allows for a wide variety of arrangements of the speakers 12 for use in selected venues or configurations.

When the line array assembly 10 is installed and in use in a venue, such as during set up, audio signals are provided to each of the speakers 12. The sound field generated by the line array assembly 10 is highly dependent on the number of speakers 12 in the array, the inclination angle(s) of the array, and the relative splay angles between each speaker 12 in the array. The audio signals provided to the speakers 12 can also be controlled, adjusted, timed, filtered, or otherwise processed through one or more audio processors, such as a Digital Signal Processor (DSP), to generate a desired overall sound field from the line array assembly 10. The one or more DSPs or other audio processors may be remote from the speakers 12 or partially or fully on board the respective speakers 12.

In accordance with aspects of the present technology, the interconnected speakers 12 in the line array assembly 10 are powered smart speakers 12 that are situationally aware and configured to communicate with each other to automatically determine the position of each speaker 12 within the array, and the speakers' splay and inclination angles. This positional and orientation information can then be provided to the one or more DSPs to control, adjust, or otherwise process the audio signals to generate the overall desired sound field for the particular position and arrangement of the line array assembly 10.

Figure 20:
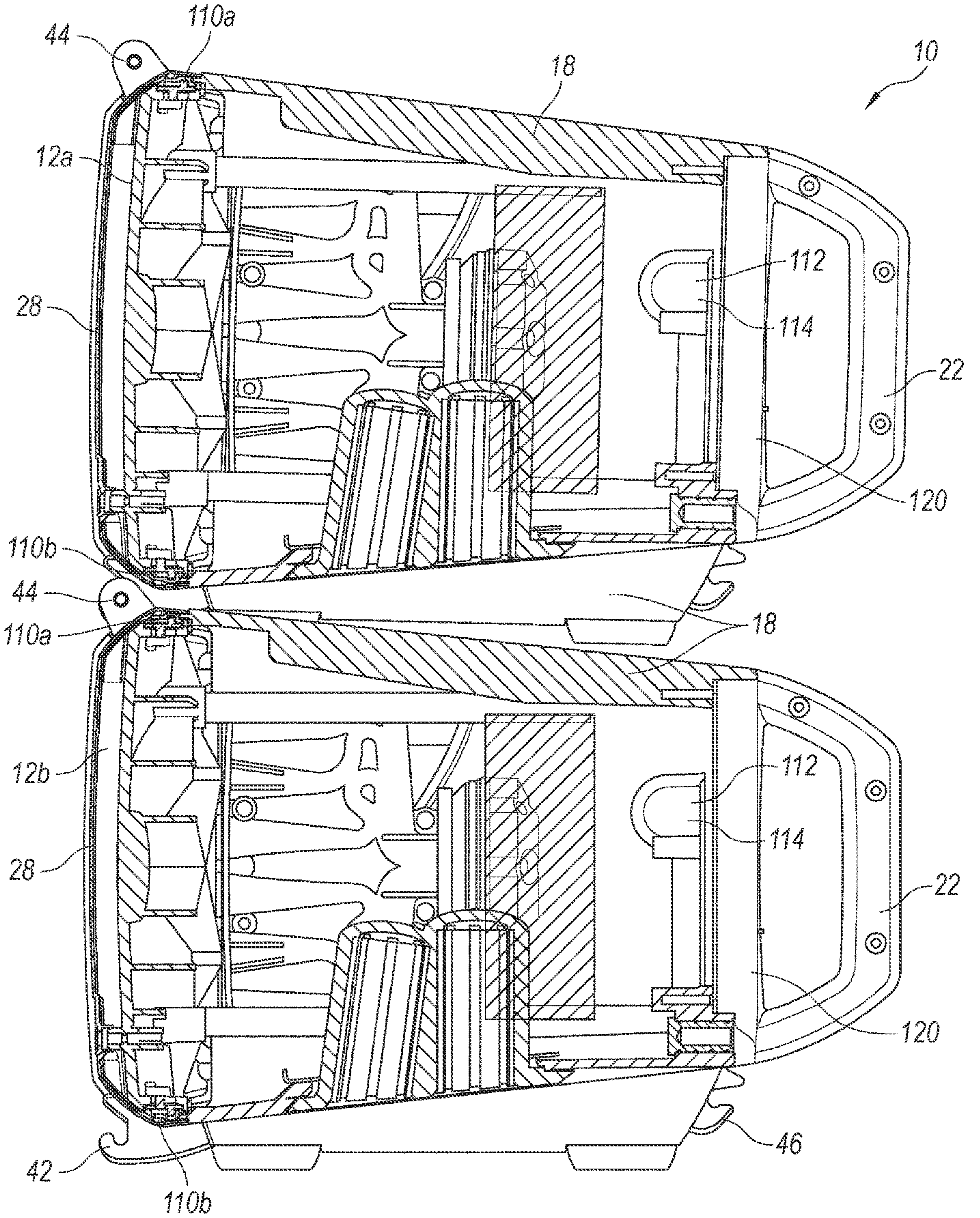
FIG. 20 is a partial cross-sectional view taken substantially along line 20-20 of FIG. 3 showing the speakers in a first arrangement at approximately a 0-degree alignment relative to each other, and with sensors positioned adjacent to top and bottom portions of the speakers.
Figure 21:
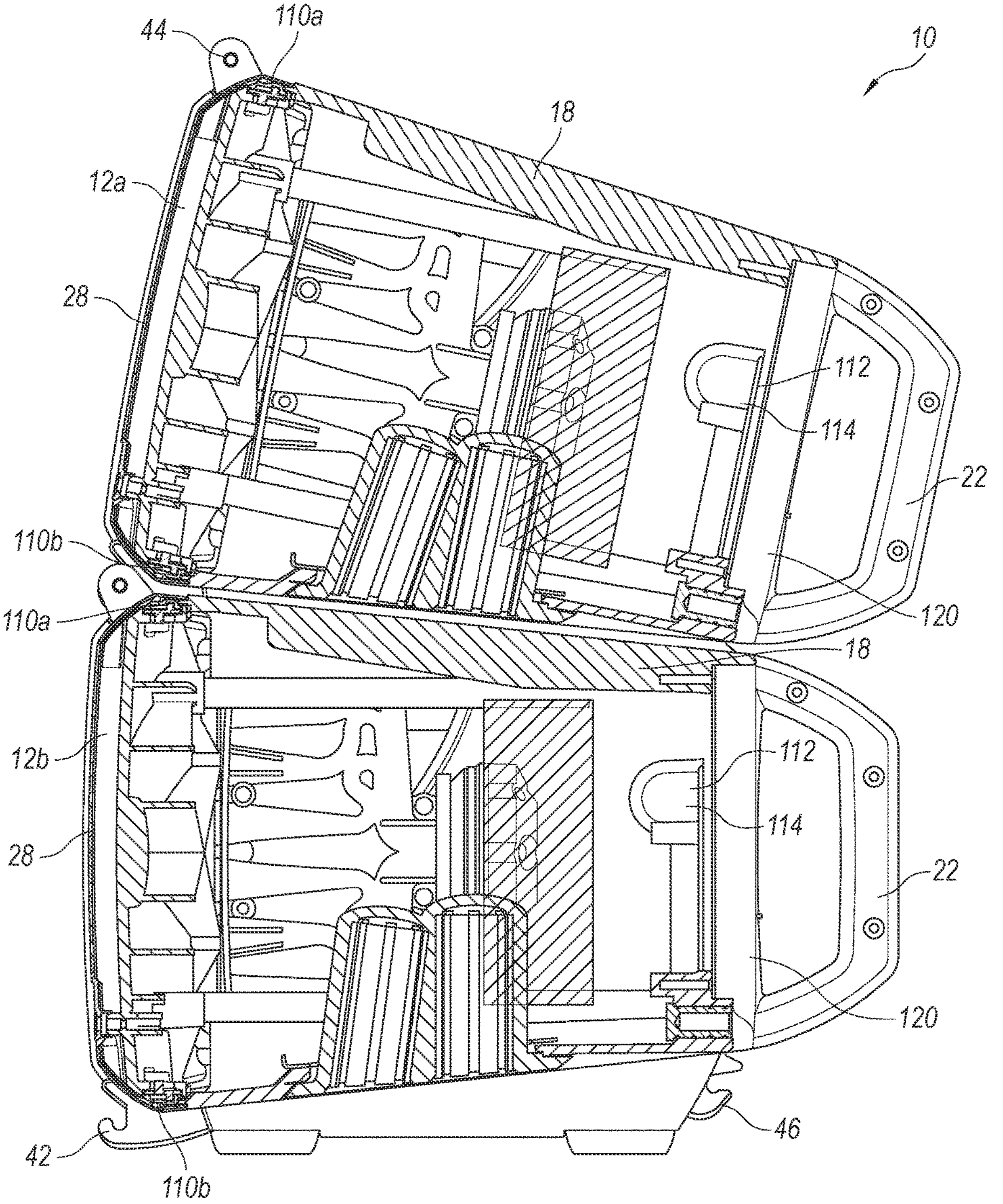
FIG. 21 is a partial cross-sectional view of the speakers of FIG. 20 showing the speakers in a second arrangement at approximately a 12-degree alignment relative to each other.
Figure 22:
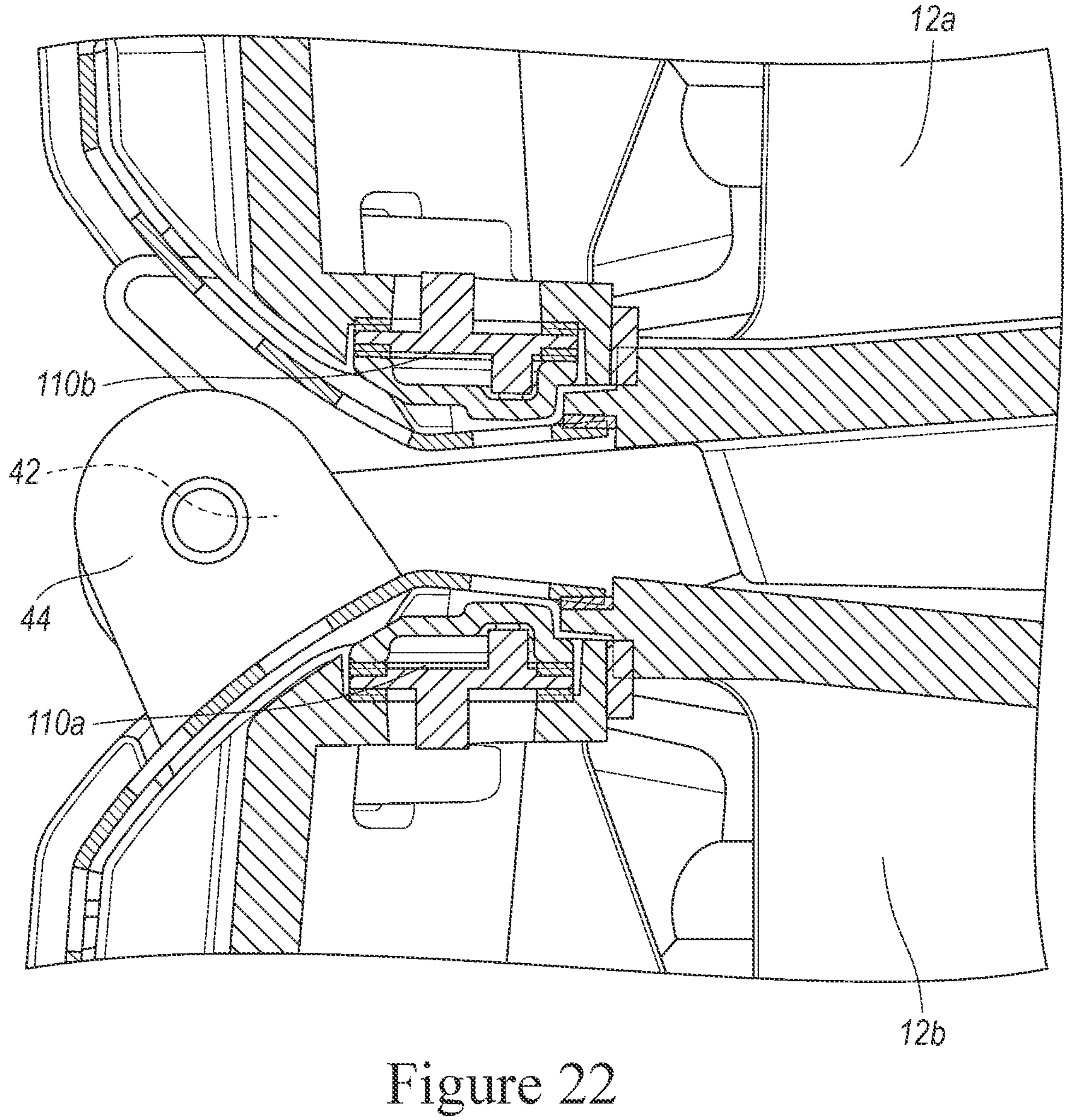
FIG. 22 is an enlarged cross-sectional view of communication modules at top and bottom portions of adjacent speakers in accordance with an embodiment of the present technology, wherein the adjacent speakers are at a first angular alignment relative to each other.
Figure 23:
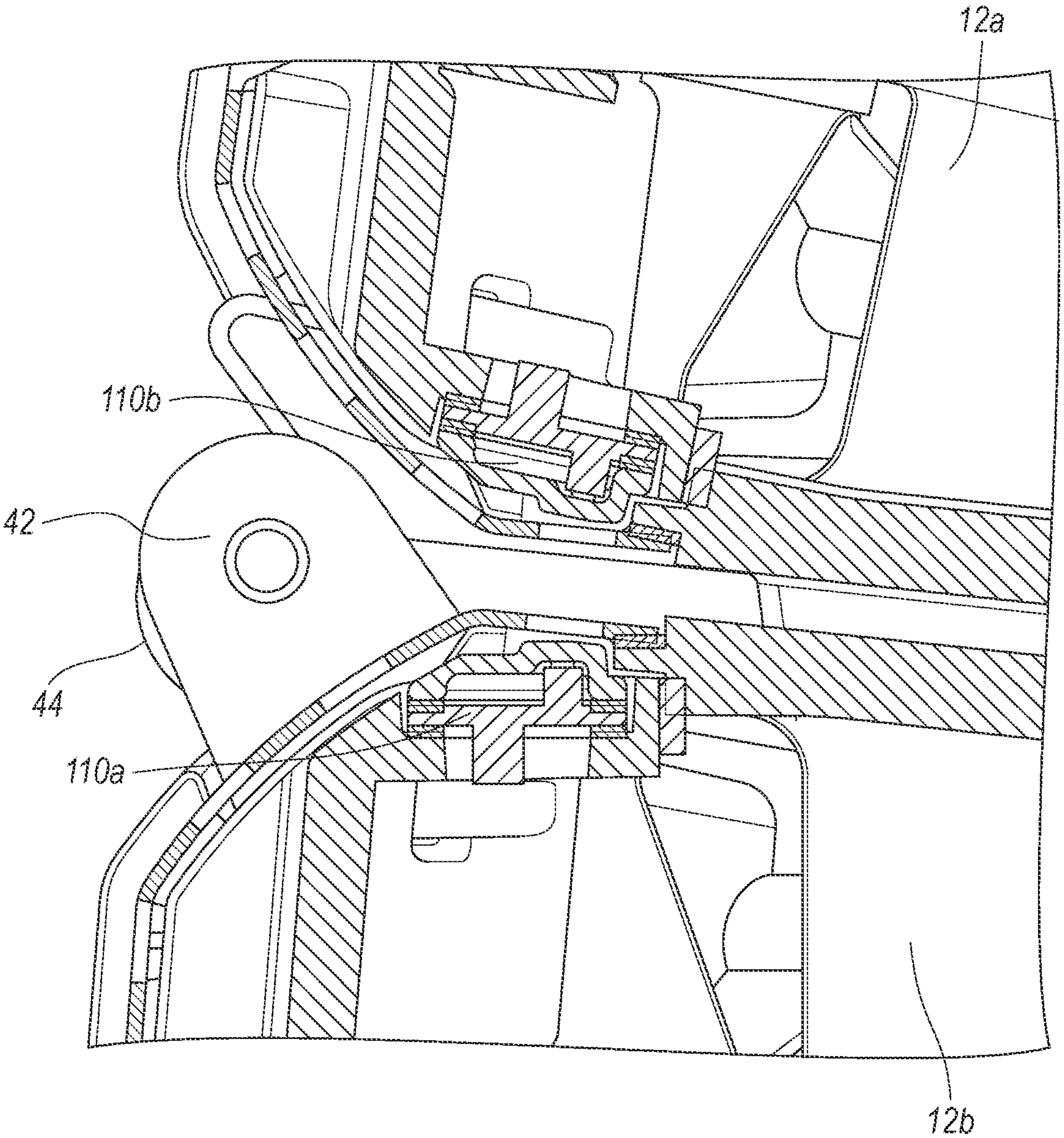
FIG. 23 is an enlarged cross-sectional view of the smart sensors of FIG. 22, wherein the adjacent speakers are at a second angular alignment relative to each other.

In at least one embodiment of the present technology, each speaker 12 within the line array assembly 10 (FIG. 1), is configured to provide self-awareness information regarding the speaker's positional and angular orientation within the line array assembly 10. FIGS. 20 and 21 are cross-sectional views of a pair of interconnected speakers 12*a* and 12*b* oriented with a splay angle of, as an example, approximately 0° (FIG. 20) and 12° (FIG. 21). FIGS. 22 and 23 are enlarged cross-sectional views of adjacent top and bottom edge portions of the interconnected speakers 12*a* and 12*b*, wherein the speakers are oriented with splay angles of 0° (FIG. 22) and 12° (FIG. 23). Although only two speakers are shown and discussed in connection with FIGS. 20-24, the discussion about the speakers applies to all of the speakers 12 of the line array assembly 10 and any adjacent pair of speakers within the array.

Each speaker 12 in the line array assembly 10 has an accelerometer 112 and a microcontroller 114 within the speaker cabinet 18 and communicatively coupled to each other. Each speaker 12 also has an upper communication module 110*a* adjacent to the top portion of the speaker's cabinet 18, and a lower communication module 110*b* adjacent to the bottom portion of the speaker's cabinet 18. In the illustrated embodiment, each of the upper and lower communication modules 110*a* and 110*b* comprise a transmitter and a receiver configured to communicate with a similar communication module 110 of an immediately adjacent speaker within the line array assembly 10. Each of the upper and lower communication modules 110*a* and 110*b* of a speaker 12 is positioned adjacent to the respective upper and lower edge of the speaker's front face 28 and at approximately the mid-line of the front face 28. Accordingly, as seen in FIGS. 20-24, when two adjacent speakers 12*a* and 12*b* are hung or otherwise connected together as described above, the upper communication module 110*a* of the lower speaker 12*b* is adjacent to and aligned with the lower communication module 110*b* of the upper speaker 12*a*.

The accelerometer 112 can be a three-axis model configured to allow determination of the respective speaker's fore-aft tilt relative to vertical (i.e. inclination) and optionally left-right tilt relative to horizontal. The microcontroller 114 is coupled to and communicates with the accelerometer 112 in the module. The microcontroller can acquire and filter the signals of the accelerometer 112 and convert them to absolute inclination angle values for that speaker 12. The microcontroller 114 can communicate information upwardly and downwardly within the array about each speaker's inclination angle values to the microcontrollers 114 in the other speakers 12 within the line array assembly 10. For example, if there are four speakers 12 in an array, the speaker 12 in Position 2 (i.e., the second speaker down from the top) knows information about the speaker 12 above it in Position 1. The speaker in Position 2 takes this information along with its own information and passes it down to the third speaker 12 in Position 3. The speaker 12 in Position 3 knows initially about what is below the speaker 12 and about itself, and passes this information upwardly to the speaker in Position 2, which then adds to this information the information about itself and the speaker above in Position 1. Then, the speaker in Position 2 passes this new body of information upwardly to the speaker in Position 1, which then knows about itself as well as the speakers in Positions 2, 3, and 4. This collection of information then gets passed back downwardly, and the process is repeated until every speaker knows the information, including the positional and orientation information and/or other selected information, about every other speaker in the array. In some embodiments, the microcontroller 114 in each speaker is configured to communicate with and receive signals from the accelerometer 112 via a I2C (or SPI) protocol. Other embodiments can use other communication protocols between the components.

The microcontroller 114 is also configured to filter the noise from the accelerometer signals in extremely noisy environments. For example, the microcontroller 114 can use a low pass filter (LPF) to remove the effect of speaker cabinet vibrations, interference from other electronics, noise of the accelerometer's internal components, and even swinging of the array. A single pole filter is computationally cheap yet may be suitable in some embodiments. Alternatively, a biquad IIR filter would allow a steeper rolloff (i.e. faster convergence of splay angle data). Other filters involving histograms and hysteresis can also reduce spurious noise in the accelerometer's signals.

The microcontroller 114 can also be configured to convert voltage values to tilt angle values in degrees by calculating arctan (X/Z), which does not require scaling the individual X and Z values. In some embodiments, an offset may need to be applied, as it is unlikely the mounting of the accelerometer 112 within the speaker will be at 0° when the speaker is mounted at 0°, for example, because of assembly tolerances during manufacturing or device tolerances of the accelerometer or other reasons. The calculation of arctan (Y/Z) may indicate if the array is turned to be vertical, horizontal, or if hung in an acute or obtuse orientation.

The microcontroller 114 is also coupled to and communicates with the upper and lower communication modules 110*a* and 110*b* in the speaker 12. The transmitter and receiver in each of the upper and lower communication modules 110*a* and 110*b* is configured to communicate with the receiver and transmitter, respectively in the next closest communication module 110 of an immediately adjacent speaker 12, if any. For example, the upper communication module 110*a* of a speaker 12 is configured to communicate upwardly to determine if there is an immediately adjacent lower communication module 110*b* in a next-above speaker. Similarly, each lower communication module 110*b* of a speaker 12 is configured to communicate downwardly to determine if there is an immediately adjacent upper communication module 110*b* in a next-below speaker. The speaker's upper and lower communication modules 110*a* and 110*b* each communicate with the associated microcontroller 114 in that speaker 12, which communicates with the microcontrollers 114 in the other speakers 12 up and down the line array assembly 10. This communication between the speakers 12 in the line array assembly allows point-to-point communication among peers, and each speaker 12 can determine its relative position within the line array assembly 10 (FIG. 1), as well as its angular orientation within the array.

In the illustrated embodiment, the microcontroller 114 and the upper and lower communication modules 110*a* and 110*b* periodically transmit upwardly and/or downwardly to communicate with the other speakers 12 wirelessly via infrared (IR) signals and communication protocol. Other embodiments can use other wireless communication protocols, such as Wi-Fi, Bluetooth Low Energy (BTLE), ZigBee, RF (radio frequency), NFC (near-field communication), magnetic signaling, acoustic signaling, light-based, or other wireless communication protocols. In yet other embodiments, the speakers 12 within the line array assembly 10 can communicate with each other through a hard-wired system, such as Ethernet, I2C (or SPI) protocol, Out-Of-Band XLR Communications, Power Line Communications, or the like, although such hard-wire interconnections may increase the complexity of assembling and disassembling the line array assembly 10.

In the illustrated embodiment, the microcontrollers 114 in the line array assembly 10 communicate via an ad-hoc network protocol, so that all information about each speaker 12 is eventually shared between the microcontrollers 114 in each of the speakers 12 without needing central coordination. Accordingly, the line array assembly 10 is configured so that, when the speakers are activated, the microcontroller 114 of each speaker causes the upper and lower communication modules 110*a* and 110*b* to transmit upwardly and downwardly, respectively. If a speaker 12 receives a signal from above, the microcontroller 114 determines that the speaker is not in Position 1 within the array. If, however, the upper communication module 110*a* of a speaker transmits upwardly but does not receive a response signal from a next-above speaker, the microcontroller 114 determines that the speaker 12 is in Position 1 within the array. The microcontroller 114 then transmits through its lower communication module 110*b* to the other speakers that it is in Position 1.

Similarly, if a speaker 12 receives a response signal from above but does not receive a signal from below, the microcontroller 114 determines that the speaker 12 is in the last position within the line array assembly 10. The microcontroller 114 in that last speaker then transmits upwardly through its upper communication module 110*a* to the other speakers that it is in the last position. Once the speaker in Position 1 is identified and communicated downwardly, the microcontroller 114 in next-below speaker can confirm it is in Position 2 and communicates that information downwardly to the speakers below. The microcontroller 114 in each subsequent speaker 12 below can identify its position within the line array assembly 10. This process of communicating upwardly and downwardly between speakers 12 occurs multiple times that equals one less than the number of speakers 12 in the line array for all of the speakers 12 to be situationally aware. For example, if the line array assembly 10 has 6 speakers, the up and down transmissions occur at least 5 times.

The determined speaker position and inclination information, along with the orientation information, i.e., the inclination information of each speaker, provides situational information about all of the speakers in the line array assembly 10. The microprocessors 114 share the situational information upwardly and downwardly to all of microprocessors in the array of speakers. In some embodiments, the microprocessors 114 are configured to determine the splay angle of each speaker based on the positional information and inclination information of the speakers. For example, the inclination angle, which may be referred to as the top hang angle or the bumper angle, relative to vertical for the speaker 12*a* in Position 1 (i.e., the first speaker) is determined via the accelerometer 112. The top hang angle may correspond to the splay angle for the first speaker 12*a* if, for example, the connection points of the support rack 16 are horizontal. If the support rack 16 is not horizontal, the inclination or top hang angle of the first speaker 12*a* may be different that the splay angle. The splay angle of the speaker 12*b* in Position 2 (i.e., the second speaker) is determined by subtracting the inclination angle of the first speaker 12*a* from the inclination angle of the second speaker 12*b*. Accordingly, the microprocessor 114 for each subsequent speaker determines the splay angle of that subsequent speaker 12 by subtracting the inclination angle of the next-above speaker from the inclination angle of that lower speaker 12. The splay angles for all of the speakers 12 can be shared upwardly and downwardly between the microprocessors 114 within the array and are provided to the audio processor for optimum processing of the audio signals being provided to the line array assembly 10.

In some embodiments, the line array assembly 10 can be configured with remote communication system for communicating with each speaker 12 in a line array assembly 10. In these embodiments, however, such communication systems may utilize an RSSI number (Received Signal Strength Indicator) to represent the strength of the radio signal that is received from each speaker. The RSSI, however, can be a very noisy indicator and potentially unusable alone. Accordingly, a filter can be used to filter the RSSI and combines it with data from the accelerometer to derive speaker order and splay angles. By filtering and combining in this way, the normally unsuitable RSSI data can be used for accurate loudspeaker array configuration. The communication system for this embodiment may be beneficial for controlling, adjusting, or otherwise processing signals for communicating with all of the speakers 12 in multiple line array assemblies 10 in a venue or a room.

In some embodiments, each speaker 12 within the line array assembly 10 can include a network connector 120 coupled to the microcontroller 114 that allows the microcontroller 114 to communicate through a network to a remote audio processor the speaker's position within the array and its angular orientation (i.e., inclination and/or splay). The DSP or other audio processor then uses this array information to process the audio signals provided to each speaker 12 within the line array assembly 10 to generate the desired sound field from the interconnected speakers. The network connector 120 can be an ethernet connection, although other embodiments can communicate with the remote network wirelessly, such as via a Wi-Fi, BTLE, or other wireless communication protocol. The networked system may also allow communication to external devices, such as a phone, tablet, or laptop, for assisting a user in configuring the line array assembly 10.

References throughout the foregoing description to features, advantages, benefits, or similar language do not imply that all of the features and advantages that may be realized with the present technology should be or are in any single embodiment of the present technology. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

The above Detailed Description of examples and embodiments of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. The teachings of the present technology provided herein can be applied to other systems, not necessarily the system described above. The elements and acts of the various examples described above can be combined to provide further implementations of the present technology. Some alternative implementations of the present technology may include not only additional elements to those implementations noted above, but also may include fewer elements. Further any specific numbers noted herein are only examples: alternative implementations may employ differing values or ranges.

From the foregoing, it will be appreciated that specific embodiments of the present technology have been described herein for purposes of illustration, but that various modifications may be made without deviating from the spirit and scope of the various embodiments of the present technology. Further, while various advantages associated with certain embodiments of the present technology have been described above in the context of those embodiments, other embodiments may also exhibit such advantages, and not all embodiments need necessarily exhibit such advantages to fall within the scope of the present technology. Accordingly, the present technology is not limited, except as by the appended claims.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

We claim:

1. A speaker array assembly for use with an audio processor, comprising:

a plurality of speaker assemblies arrangeable and interconnectable to form an array, each speaker assembly being interchangeably positionable in the array in a first end speaker position, a second end speaker position, and a middle speaker position between the first and second end speaker positions, each speaker assembly comprising a speaker driver, a microcontroller configured to communicate with the digital signal controller, an incline detector couplable to the microcontroller or to the digital signal controller, and first and second communication modules coupled to the microcontroller, wherein the first communication module is spaced apart from the second communication module;

wherein the first and second communication modules of each speaker assembly are configured to communicate with one or more adjacent speaker assemblies in the array, wherein the microcontroller of each speaker assembly is configured to use signals from its first and second communication modules based on the communication with the one or more adjacent speaker assemblies and determine whether the each speaker assembly is in the first end speaker position, the second end speaker position, or the middle speaker position and determine a positional order of the each speaker assembly within the array relative to others of the speaker assemblies in the array;

wherein the microcontroller and the incline detector of each speaker assembly are configured to determine an angular orientation of the each speaker assembly; and wherein each microcontroller is configured to communicate with the audio processor about the positional order and the angular orientation of the each speaker assembly in the array, and each speaker assembly in the array is configured to receive audio signals from the audio processor to generate a desired sound field from the array based on the positional order and the angular orientation of the each speaker assembly in the array.

2. The speaker array assembly of claim 1 wherein the plurality of speaker assemblies are positioned in a horizontal or vertical, curved linear array wherein the first end speaker position is a top speaker position, and the second end speaker position is a bottom speaker position.

3. The speaker array assembly of claim 2 wherein the first communication module of each speaker assembly is an upper communication module adjacent to an upper portion of the each speaker assembly, and the second communication module of each speaker assembly is a lower communication module adjacent to a lower portion of the each speaker assembly.

4. The speaker array assembly of claim 3 wherein the first and second communication modules are configured for use in determining whether the each speaker assembly is in the first end speaker position, the second end speaker position, or the middle speaker position.

5. The speaker array assembly of claim 1 wherein the first communication module of each speaker assembly has a first transmitter and a first receiver, and the second communication module of each speaker assembly has a second transmitter and second receiver, wherein the first transmitter and first receiver of a first one of the plurality of speaker assemblies is configured to communicate with the second transmitter and second receiver of the second communication module of a second one of the plurality of speaker assemblies if the second one of the plurality of speaker assemblies is positioned immediately adjacent to the first one of the plurality of speaker assemblies.

6. The speaker array assembly of claim 5 wherein the second transmitter and second receiver of the first one of the plurality of speaker assemblies is configured to communicate with the first transmitter and first receiver of a third one of the plurality of speaker assemblies if the third one of the plurality of speaker assemblies is positioned immediately adjacent to the first one of the plurality of speaker assemblies.

7. The speaker array assembly of claim 6 wherein the microcontroller of each speaker assembly is configured to determine the positional order of the each speaker assembly relative to other ones of the plurality of speaker assemblies in the array if the second and/or third ones of the plurality of speaker assemblies is positioned immediately adjacent to first or second sides of the each one of the speaker assemblies.

8. The speaker array assembly of claim 1 wherein the microcontroller of each speaker assembly is configured to determine the angular orientation of the each speaker assembly relative to adjacent ones of the plurality of speaker assemblies based on inclination signals received from other ones of the plurality of speaker assemblies in the array.

9. The speaker array assembly of claim 1 wherein the plurality of speaker assemblies are arranged in a curved vertical array, and each speaker assembly is configured to communicate with the one or more adjacent ones of the plurality of speaker assemblies and, based on information from the first and second communication modules and the incline detector of the each speaker assembly, to determine the angular orientation of the each speaker assembly relative to vertical and relative to angular orientation information from the other ones of the plurality speaker assemblies in the array.

10. The speaker array assembly of claim 1 wherein the incline detector in each speaker assembly is an accelerometer.

11. The speaker array assembly of claim 1 wherein each speaker assembly is configured to provide self-awareness information about the each speaker assembly's positional and angular orientation within the array based on signals from the first and second communication modules and the incline detector relative to other ones of the plurality of speaker assemblies in the array.

12. The speaker array assembly of claim 1 wherein each speaker assembly comprises a speaker cabinet containing the speaker driver, the incline detector, the microcontroller, and the first and second communication modules, wherein the first communication module is adjacent to a first portion of the speaker cabinet and the second communication module is adjacent to a second portion of the speaker cabinet opposite the first portion.

13. A speaker assembly for use in a speaker array having a plurality of interconnected speakers, the speaker assembly comprising:

a speaker cabinet;

a speaker driver in the speaker cabinet;

a microcontroller coupled to the speaker cabinet;

an incline detector coupled to the microcontroller, wherein the incline detector is configured to provide a signal to the microcontroller related to an angular orientation of the speaker assembly relative to vertical and/or relative to one or more of the plurality of interconnected speakers; and first and second communication modules coupled to the speaker cabinet and to the microcontroller, wherein the first and second communication modules are spaced apart from each other and are configured to communicate with one or more adjacent ones of the interconnected speakers;

wherein the microcontroller is configured to receive signals from the first and second communication modules related to the communication with the one or more adjacent interconnected speakers, and based on the received signals, to determine a positional order of the speaker assembly in the speaker array relative to the plurality of interconnected speakers; and wherein the microcontroller is configured to provide information related to the positional order and the angular orientation for use by an audio processor providing audio signals to the speaker array.

14. The speaker assembly of claim 13 wherein the first communication module is an upper communication module adjacent to an upper portion of the speaker cabinet, and the second communication module is a lower communication module adjacent to a lower portion of the speaker cabinet.

15. The speaker assembly of claim 14 wherein the first communication module is configured to provide information indicating whether one of the interconnected speakers of the speaker array is immediately adjacent to the upper portion of the speaker cabinet, and the second communication module is configured to provide information indicating whether another one of the interconnected speakers of the speaker array is immediately adjacent to the bottom portion of the speaker cabinet.

16. The speaker assembly of claim 13 wherein the first communication module has a first transmitter and a first receiver, and the second communication module has second transmitter and second receiver, wherein the first transmitter and first receiver are configured to communicate with a first one of the interconnected speakers of the speaker array if the first one of the interconnected speakers is in a first position adjacent to a first side of the speaker assembly, and the second transmitter and second receiver are configured to communicate with a second one of the interconnected speakers if the second one of the interconnected speakers is in a second position adjacent to a second side of the speaker assembly opposite the first side.

17. The speaker assembly of claim 13 wherein the incline detector is an accelerometer.

18. A speaker array assembly, comprising:

a plurality of speaker assemblies arrangeable and interconnectable to form a array, each speaker assembly being interchangeably positionable in the array in a top speaker position, a bottom end speaker position, and a middle speaker position between the top and bottom end speaker positions, each speaker assembly comprising a speaker driver, a microcontroller, and first and second communication modules coupled to the microcontroller, wherein the first communication module is spaced apart from the second communication module;

wherein the first and second communication modules of each speaker assembly are configured to communicate with one or more adjacent speaker assemblies in the array, wherein the microcontroller of each speaker assembly is configured to determine, using signals from its first and second communication modules based on the communication with the one or more adjacent speaker assemblies, whether the each speaker assembly is in the top speaker position, the bottom speaker position, or the middle speaker position in the speaker array, and determine a positional order of the each speaker assembly within the array relative to others of the speaker assemblies in the array; and wherein each microcontroller is configured to communicate with an audio processor about the positional order of the speaker assemblies, and each speaker assembly in the array is configured to receive signals from the audio processor to generate a desired sound field from the array based on the positional arrangement of the plurality of speaker assemblies in the speaker array assembly.

19. The speaker array assembly of claim 18 wherein each speaker assembly further comprises an accelerometer coupled to the microcontroller in the each speaker assembly, wherein the accelerometer and the microcontroller are configured to determine the incline angle of the each speaker assembly and the splay angle of the each speaker assembly relative to one or more other ones of the speaker assemblies of the array.

* * * * *